United States Patent
Lee et al.

(10) Patent No.: US 8,646,932 B2
(45) Date of Patent: Feb. 11, 2014

(54) BACKLIGHT UNIT AND THE DISPLAY DEVICE HAVING THE SAME

(75) Inventors: Kum Tae Lee, Seoul (KR); Moon Jeong Kim, Seoul (KR); Duk Hyun Yun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 179 days.

(21) Appl. No.: 13/159,701

(22) Filed: Jun. 14, 2011

(65) Prior Publication Data

US 2011/0305003 A1     Dec. 15, 2011

(30) Foreign Application Priority Data

Jun. 15, 2010  (KR) .................. 10-2010-0056789
Jun. 15, 2010  (KR) .................. 10-2010-0056791
Jun. 23, 2010  (KR) .................. 10-2010-0059402
Jun. 23, 2010  (KR) .................. 10-2010-0059403

(51) Int. Cl.
*G09F 13/04*     (2006.01)
*G09F 13/08*     (2006.01)

(52) U.S. Cl.
USPC .............. 362/97.3; 362/97.1; 349/63; 349/62

(58) Field of Classification Search
USPC .......... 362/249.02, 227, 257, 311.01–311.02, 362/337, 217.1, 217.11, 217.14–217.15, 362/364, 365, 217.02, 217.05, 97.1–97.3, 362/217.01, 219, 222, 225, 800, 362; 349/58, 61–64, 69
See application file for complete search history.

(56) References Cited

U.S. PATENT DOCUMENTS

| 7,097,317 | B2 * | 8/2006 | Kim .................................. 362/29 |
| 7,674,000 | B2 * | 3/2010 | Valerio et al. ................. 362/97.3 |
| 7,959,321 | B2 * | 6/2011 | Ryu et al. ....................... 362/231 |
| 2005/0265029 | A1 | 12/2005 | Epstein et al. ................. 362/339 |
| 2006/0256255 | A1 | 11/2006 | Minami ........................... 349/65 |
| 2009/0128735 | A1 * | 5/2009 | Larson et al. ................... 349/62 |
| 2009/0284956 | A1 * | 11/2009 | Gomi et al. ................... 362/97.3 |
| 2009/0303410 | A1 * | 12/2009 | Murata et al. ................... 349/58 |
| 2010/0110330 | A1 * | 5/2010 | Ajichi et al. ..................... 349/62 |
| 2010/0232138 | A1 * | 9/2010 | Tsai .............................. 362/97.1 |
| 2011/0013376 | A1 * | 1/2011 | Kim et al. ..................... 362/97.1 |
| 2011/0075397 | A1 * | 3/2011 | Hsu et al. ..................... 362/97.1 |

FOREIGN PATENT DOCUMENTS

| EP | 1 867 916 A1 | 12/2007 |
| JP | 2006-019141 A | 1/2006 |
| KR | 10-2003-0046047 A | 6/2003 |

(Continued)

OTHER PUBLICATIONS

European Search Report dated Sep. 26, 2011 issued in U.S. Appl. No. 11/170,010.

*Primary Examiner* — Donald Raleigh
(74) *Attorney, Agent, or Firm* — Ked & Associates, LLP

(57) ABSTRACT

Provided are a backlight unit and a display device having the same. The backlight unit configured to emit light onto a display panel in which one screen is defined into a plurality of display areas includes a bottom frame having a bottom surface and a sidewall, a plurality of light emitting diodes (LEDs) defining a plurality of light emitting areas corresponding to the display areas of the display panel, and an integrated light guide plate covering the plurality of LEDs, the integrated light guide plate being disposed on the plurality of light emitting areas corresponding to one screen. The light guide plate has a plurality of grooves for receiving at least one LED in an under surface thereof.

15 Claims, 16 Drawing Sheets

(56) References Cited

FOREIGN PATENT DOCUMENTS

| KR | 10-2009-0073542 A | 7/2009 |
| KR | 10-2009-0117419 A | 11/2009 |
| KR | 10-2010-028444 A | 3/2010 |
| WO | WO 2006104319 A1 * | 10/2006 |
| WO | WO 2007/138294 A1 | 12/2007 |

* cited by examiner

BACKLIGHT UNIT AND THE DISPLAY DEVICE HAVING THE SAME

CROSS-REFERENCE TO RELATED APPLICATIONS

The present application claims priority under 35 U.S.C. 119 and 35 U.S.C. 365 to Korean Patent Application No. 10-2010-0056789 (Jun. 15, 2010), No. 10-2010-0056791 (Jun. 15, 2010), No. 10-2010-0059402 (Jun. 23, 2010), and No. 10-2010-0059403 (Jun. 23, 2010), which is hereby incorporated by reference in its entirety.

BACKGROUND

The present disclosure relates a backlight unit and a display device having the same, and more particularly, to a display device in which a backlight unit is realized by a light emitting diode.

A light emitting diode (LED) may constitute a light emitting source using compound semiconductor materials such as GaAs-based materials, AlGaAs-based materials, GaN-based materials, InGaN-based materials and InGaAlP-based materials.

Such a light emitting diode is packaged, and thus is being used as a light emitting apparatus that emits light having various colors. The light emitting apparatus is being used as a light source in various fields, e.g., lighting displays, character displays, and image displays.

SUMMARY

Embodiments provide a backlight unit having a new structure and a display device having the same.

Embodiments also provide a slim backlight unit and a display device having the same.

Embodiments also provide a backlight unit to which a separate driving method is applied and a display device having the same.

In one embodiment, a backlight unit configured to emit light onto a display panel in which one screen is defined into a plurality of display areas includes: a bottom frame having a bottom surface and a sidewall; a plurality of light emitting diodes (LEDs) defining a plurality of light emitting areas corresponding to the display areas of the display panel; and an integrated light guide plate covering the plurality of LEDs, the integrated light guide plate being disposed on the plurality of light emitting areas corresponding to one screen, wherein the light guide plate has a plurality of recesses for receiving at least one LED in an under surface thereof.

In another embodiment, a display device includes: a bottom frame having a bottom surface having a square shape and a side wall; a plurality of light emitting diodes (LEDs) locally driven; an integrated light guide plate covering the entire surface of the plurality of LEDs, the integrated light guide plate having a plurality of recesses for receiving at least one LED; and a display panel disposed on the integrated light guide plate.

According to the embodiments, since the light guide plate is formed in one body to correspond to a screen of the display panel in the backlight unit in which the light emitting areas are locally driven, a dark line occurring between the light guide plates 30 may not occur and a slim backlight unit may be manufactured.

Also, the separate driving method such as a local dimming method or impulsive method may be provided to reduce power consumption as well as improve contrast of a screen, thereby improving an image quality of the display device.

The details of one or more embodiments are set forth in the accompanying drawings and the description below. Other features will be apparent from the description and drawings, and from the claims.

DETAILED DESCRIPTION OF THE EMBODIMENTS

Figure 1:
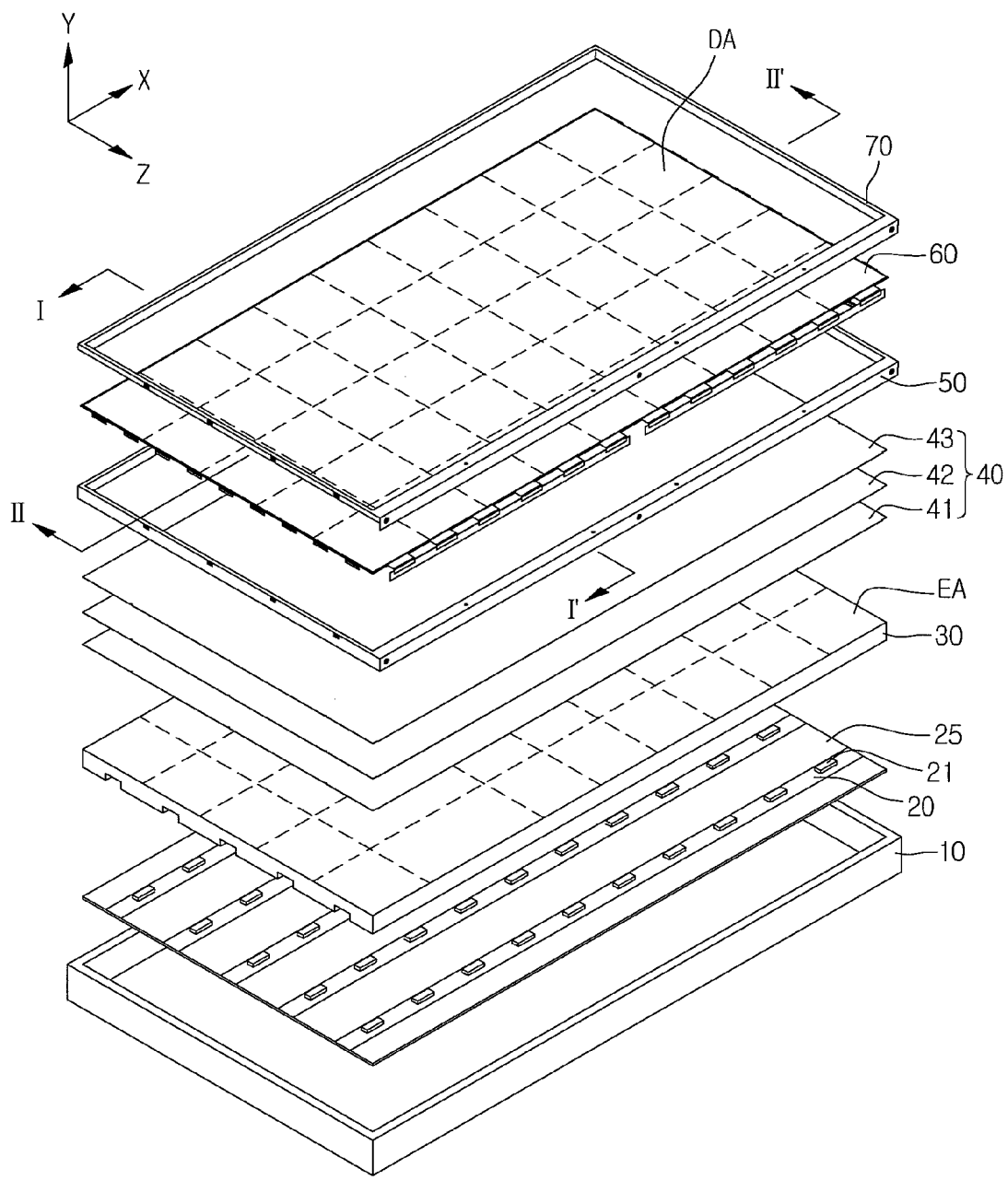
FIG. 1 is an exploded perspective view of a display device according to a first embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In this specification, when it is described that one comprises (or includes or has) some elements, it should be understood that it may comprise (or include or has) only those elements, or it may comprise (or include or have) other elements as well as those elements if there is no specific limitation.

In the drawings, anything unnecessary for describing the present disclosure will be omitted for clarity, and thicknesses are enlarged for the purpose of clearly illustrating layers and areas. Like reference numerals in the drawings denote like elements, and thus their descriptions will be omitted.

It will also be understood that when a layer, a film, an area or a plate is referred to as being 'on' another one, it can be directly on the other one, or one or more intervening layers, films, areas or plates may also be present. On the other hand, it will also be understood that when a layer, a film, an area or a plate is referred to as being "directly on" another one, intervening layers, films, areas, and plates may not be present.

In a display device according to embodiments, a light guide plate constituting a backlight unit which performs a separate driving method is formed in one body to correspond to the entire screen of a display panel.

Hereinafter, a display device according to a first embodiment will be described with reference to FIGS. 1 to 4.

Figure 2:
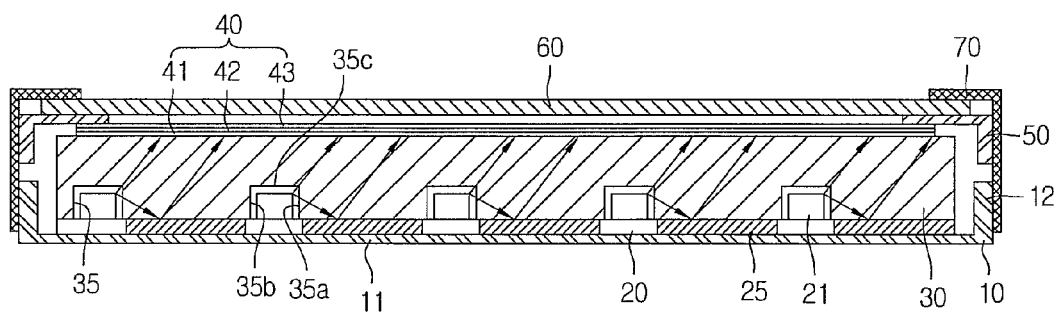
FIG. 2 is a sectional view taken along line I-I' of the display device of FIG. 1.
Figure 3:
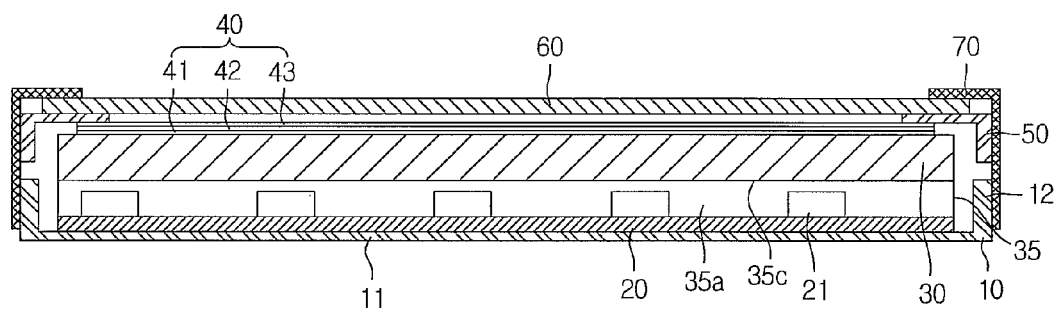
FIG. 3 is a sectional view taken along line II-II' of the display device of FIG. 1.
Figure 4:
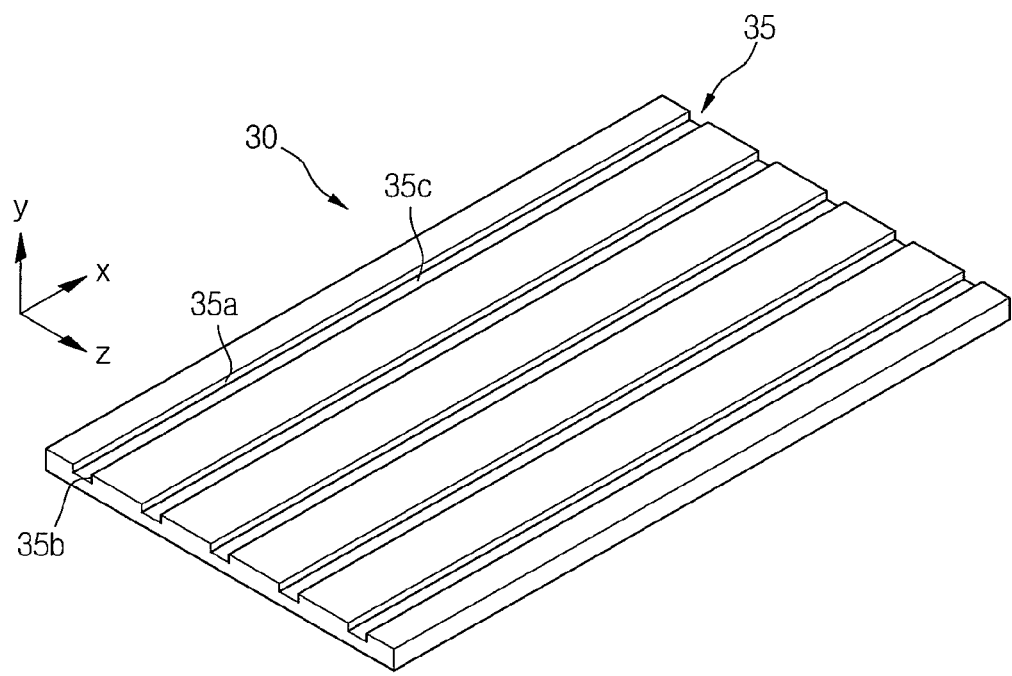
FIG. 4 is a perspective view illustrating a first usage example of a light guide plate of FIG. 1.

FIG. 1 is an exploded perspective view of a display device according to a first embodiment. FIG. 2 is a sectional view taken along line I-I' of the display device of FIG. 1. FIG. 3 is a sectional view taken along line II-II' of the display device of FIG. 1. FIG. 4 is a perspective view illustrating a second usage example of the light guide plate of FIG. 1.

The display device according to the first embodiment includes a backlight unit and a display panel receiving light from the backlight unit to display an image. Thus, the display device together with the backlight unit will be described below.

Referring to FIGS. 1 to 3, the display device according to the first embodiment includes a bottom frame 10 and a light emitting module, a reflection sheet 25, and a light guide plate 30 which are disposed within the bottom frame 10.

In the display device, the light emitting module, the reflection sheet 25, and the light guide plate 30 disposed on the light emitting module and the reflection sheet 25 constitute a light emitting part. Here, an optical sheet 40 is disposed on the light guide plate 30, and the display panel 60 is disposed on the optical sheet 40. Also, a top frame 70 is disposed on the display panel 60.

The bottom frame 10 has a bottom surface 11 (e.g., inside the bottom frame) having a rectangular flat shape with two long sides facing each other and two short sides perpendicular to the long sides and facing each other and four sidewalls 12 vertically extending from the bottom surface 11.

The bottom frame 10 is coupled to a fixing member 50 disposed on the optical sheet 40 to receive the light emitting module, the reflection sheet 25, the light guide plate 30, and the optical sheet 40 within the bottom frame 10. For example, the bottom frame 10 may be formed of a metal material. Also, a plurality of protrusions (not shown) may be disposed on the bottom surface 11 to enhance hardness.

The reflection sheet 25 and the plurality of light emitting modules alternately extend in an X-axis direction on the bottom surface 11 of the bottom frame 10.

Each of the light emitting modules may be a bar-type light emitting module. Also, the light emitting module includes a module board 20 extending in the X-axis direction and a plurality of light emitting diodes (LEDs) 21 disposed on the module board 20 in a row.

The module board 20 may include a metal core printed circuit board (metal core PCB), a FR-4 PCB, general PCB, a flexible board, and a ceramic board, but is not limited thereto. For example, a kind of the nodule board 20 may be variously varied within the technical scope of embodiments.

The module board 20 may apply a power to each of the LEDs 21 to provide light into the light guide plate 30. Here, the LEDs 21 may be separately driven.

As shown in FIG. 1, the plurality of bar-type light emitting modules may be disposed. Alternatively, the light emitting module may be formed as a single board having a size corresponding to a front surface of the bottom frame 10.

The plurality of LEDs 21 arranged on the module board 20 may be side-view type LEDs in which light is emitted through side surfaces with respect to the module board 20. That is, the LEDs 21 may be disposed within a recess part 35 of the light guide plate 30 to emit light through side surfaces of the recess part 35 of the light guide plate 30.

Each of the LEDs 21 may be a color LED that emits light having at least one color of red, blue, green, and white colors or an ultraviolet (UV) LED. Here, the color LED may include a red LED, a blue LED, a green LED, and a white LED. The disposition and emitted light of the LED 21 may be varied within the technical scope of embodiments.

The reflection sheet 25 includes a reflecting material and a reflective metal plate to re-reflect light leaking from the light guide plate 30. The reflection sheet 25 may be exposed between the module boards 20. As shown in FIG. 2, the plurality of reflection sheets separated from each other may be disposed in an area spaced between the module boards 20.

The light guide plate 30 diffusing and reflecting the light emitted from the LEDs 21 to produce planar light, thereby emitting the planar light onto the display panel 60 is disposed above the plurality of light emitting modules and the plurality of reflection sheets 25.

The light guide plate 30 is divided into a plurality of light emitting areas EAs. Each of the light emitting areas EAs has a size defined by the number of LEDs 21 emitting light into the light emitting areas EAs.

That is, when the LEDs 21 are separately driven as shown in FIG. 1, the light emitting area EA may be a portion of the light guide plate 30 on which one LED 21 is disposed. On the other hand, when the plurality of LEDs are driven at the same time, the sum of portions of the light guide plate 30 on which the plurality of LEDs 21 driven at the same time are disposed may be defined as one light emitting area EA.

The light guide plate 30 does not have bodies divided by the light emitting areas EAs. That is, the light guide plate 30 may be formed in one body covering the entire area of the plurality of LEDs 21 disposed within the bottom frame 10.

That is, although the light guide plate 30 has the plurality of divided light emitting areas EAs, the light guide plate 30 is not physically divided, but abstractly divided by an operation of the LED 21 disposed on the corresponding light emitting area EA. As shown in FIGS. 1 to 4, when the light emitting module is the bar-type light emitting module, a portion of the light guide plate 30 emitting light by the light emitting module may be defined as the light emitting area EA. As described above, when the light emitting areas EAs are defined in a row, an impulsive method for successively driving the backlight unit may be effective.

When the light guide plate 30 corresponding to one screen of the display panel 60 is formed in one body while being locally driven, a dark line occurring between the light guide plates 30 due to the physical separate of the light emitting areas EAs does not occur. Also, since a coupled portion is simplified, a slim backlight unit may be provided.

Also, the embodiment may provide a separate driving method such as a local dimming method or an impulsive method may be provided to reduce power consumption as well as to improve contrast of a screen, thereby improving an image quality of the display device.

Also, since the separate driving method may be realized using the integrated light guide plate 30, light distribution may be accurately adjusted through the divided light emitting areas EAs. Also, since the LEDs 21 is driven for each area, light having brightnesses different from each other may be emitted into each of the divided light emitting areas EAs. Thus, the display device may have superior image beauty.

The integrated light guide plate 30 has a top surface and a bottom surface. The top surface through which the planar light is generated is flat, and a plurality of recesses parts 35 for receiving the LEDs 21 are defined in the bottom surface.

As shown in FIGS. 1 to 4, the recess part 35 has a first surface 35*a* that is a light incident surface facing a side surface through which light of the LED 21 is emitted, a second surface 35*b* parallel to the light incident surface and facing a side surface of the LED 21 opposite to the light incident surface, and a third surface 35*c* facing a top surface of the LED 21. Thus, the recess part 35 may be formed in a flat-type.

As shown in FIG. 2, the first surface 35*a* of the recess part 35 serves as the light incident surface to receive light from the side surface of the LED 21. Also, an area spaced from the light incident surface to the recess part 35 is flat with respect to the top surface of the light guide plate 35 and guides the incident light to transfer the light to the top surface of the light guide plate 30.

Here, the reflection sheet 25 is not disposed in the recess part 35, but is disposed under of the flat surface which guides light in the area spaced between the recess parts 35.

Here, a distance between the LED 21 and the first surface 35*a* that is the light incident surface may be shorter than that between the LED 21 and the second surface that is the side surface opposite to the first surface 35*a*.

Referring to FIGS. 3 and 4, the recess part 35 of the light guide plate 30 may be a tunnel-type recess part which is capable of receiving the plurality of LEDs 21 constituting one row.

Here, when the recess part 35 is defined in the tunnel-type to receive the LEDs 21 constituting one row, the tunnel-type recess part 35 extends in a direction (an X-axis direction) perpendicular to a light emitting direction (a Z-axis direction) of the LEDs 21.

As described above, the plurality of recess parts 35 may be defined in the bottom surface of the light guide plate 30 and the tunnel-type recess part 35 may be provided to receive the LEDs 21 constituting one row. Thus, the integrated light guide plate 30 may be easily manufactured. Also, when the light guide plate 30 and the plurality of LEDs 21 are aligned with each other, the light guide plate 30 may be utilized even though misalignment therebetween occurs.

The light guide plate 30 may be formed of a transparent material. For example, the light guide plate 30 may be formed of one of an acryl-based resin such as polymethyl metaacrylate (PMMA), polyethylene terephthlate (PET), poly carbonate (PC), and polyethylene naphthalate (PEN).

The integrated light guide plate 30 in which the tunnel-type recess part 35 is defined may be integrally manufactured with respect to the display panel 60 defining one screen through an injection molding or extrusion. A diffusion pattern (not shown) may be disposed on the top surface of the light guide plate 30.

The optical sheet 40 may be disposed on the light guide plate 30.

For example, the optical sheet 40 may include a first diffusion sheet 41, a prism sheet 42, and a second diffusion sheet 43. The diffusion sheets 41 and 43 diffuse light emitted from the light guide plate 30, and the diffused light is concentrated into the light emitting area EA by the prism sheet 42. Here, the prism sheet 42 may selectively include horizontal and/or vertical prism sheet(s) and at least one brightness enhanced film.

The optical sheet may be not provided. Alternatively, only one diffusion sheet 41 or 43 may be provided or only one prism sheet 42 may be provided. The optical sheet 40 may be variously selected in number or kind according to characteristics of required brightness.

A support member 50 is disposed on the optical sheet 40.

The support member 50 is coupled to the bottom frame 10 to closely attach the reflection sheet 25, the light emitting module, the light guide plate 30, and the optical sheet 40 to the bottom frame 10, thereby supporting the display panel 60.

For example, the support member 50 may be formed of a synthetic resin material or a metal material.

The display panel 60 is disposed on the support member 50.

The display panel 60 displays image information using light emitted from the light guide plate 30. For example, a liquid crystal display panel may be used as the display panel 60. The display panel 60 includes an upper board, a lower board, and a liquid crystal layer disposed between the upper and lower boards. The display panel 60 may further include polarization sheets closely attached to a top surface of the upper board and a bottom surface of the lower board.

The display panel 60 may be divided into a plurality of display areas DAs and driven to correspond to the local dimming method or the impulsive method. Here, the display area DAs of the display panel may corresponding to the light emitting area EAs of the light guide plate 30 as shown in FIG. 1.

A top frame 70 is disposed on the display panel 60.

The top frame 70 has a front part disposed on a front surface of the display device and a side part bent in a direction perpendicular to that of the front part and disposed on a side surface of the display device. The side part may be coupled to the support member 50 through a coupling member such as a screw (not shown).

Referring to FIGS. 1 to 4, the display device according to the first embodiment includes the light guide plate 30 integrated corresponding to the divided display areas DAs of the display panel 60. The tunnel-type recess part 35 may be defined in the bottom surface of the light guide plate 30 to receive the LEDs 21 constituting one row. Thus, the light guide plate 30 may be easily manufactured, and the misalignment thereof may be prevented. Also, the backlight unit may be locally driven.

Hereinafter, another example of the disposition of the light guide plate 30 will be described with reference to FIG. 5.

Figure 5:
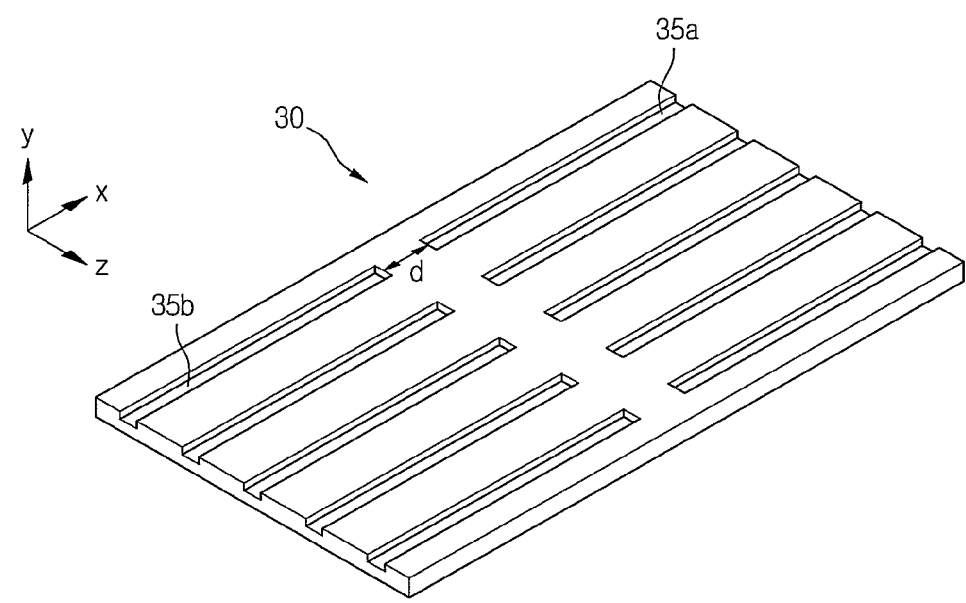
FIG. 5 is a perspective view illustrating a second usage example of the light guide plate of FIG. 1.

FIG. 5 is a perspective view illustrating a second usage example of the light guide plate of FIG. 1.

As shown in FIG. 1, the light guide plate 30 does not have bodies divided for each of the light emitting areas EAs. That is, the light guide plate 30 may be formed in one body covering the entire area of the plurality of LEDs 21 disposed within the bottom frame 10.

That is, although the light guide plate 30 of FIG. 5 has the plurality of divided light emitting areas EAs, the light guide plate 30 is not physically divided, but abstractly divided by an operation of the LED 21 disposed on the corresponding light emitting area EA. As shown in FIG. 1, when the light emitting module is the bar-type light emitting module, a portion of the light guide plate 30 emitting light by the light emitting module may be defined as the light emitting area EA.

When the light guide plate 30 corresponding to one screen of the display panel 60 is formed in one body while being locally driven, a dark line occurring between the light guide plates 30 due to the physical separation of the light emitting areas EAs does not occur. Also, since a coupled portion is simplified, a slim backlight unit may be provided. Also, effects except the foregoing effects are equal to those of the above-described example.

Unlike the light guide plate 30 of FIG. 4, when the light guide plate 30 of FIG. 5 is divided into a plurality of blocks defining each of light emitting areas of the plurality of LEDs 21 in one row, the light guide plate 30 includes block recess parts 35a and 35b with respect to the LED 21 of each of the blocks.

For example, as shown in FIG. 5, when the plurality of LEDs 21 constituting one row are divided into two blocks, block recess parts 35a and 35b longitudinally defined in a direction (an X-axis direction) perpendicular to a light emitting direction (a Z-axis direction) of the LED 21 with respect to the LEDs 21 constituting a ½ row may be defined.

The block recess parts 35a and 35b are spaced a predetermined distance d from the adjacent block recess parts 35a and 36b. The spaced distance d may be equal to or greater than that between the LEDs 21 within one block.

As described above, the plurality of LEDs 21 constituting one row may be divided into several numbers to form blocks. Here, when the block recess parts 35a and 35b are defined with respect to the LEDs 21 of each of the blocks, the separate driving method may be improved in efficiency in case where the LED 21 of the block recess parts 35a and 35b defines one light emitting area EA.

Here, like the first usage example, the plurality of LEDs 21 arranged on the module board 20 may be a side-view type LEDs in which light is emitted through side surfaces with respect to the module board 20. That is, the LEDs 21 may be disposed within a recess part 35 of the light guide plate 30 to emit light through side surfaces of the recess part 35 of the light guide plate 30. The integrated light guide plate 30 may be used for the display device of FIGS. 1 to 3.

The light guide plate 30 may be formed of a transparent material. For example, the light guide plate 30 may be formed of one of an acryl-based resin such as polymethyl metaacrylate (PMMA), polyethylene terephthlate (PET), poly carbonate (PC), and polyethylene naphthalate (PEN).

The integrated light guide plate 30 in which the block-type block recess parts 35a and 35b are defined may be integrally manufactured with respect to the display panel 60 defining one screen through an injection molding or extrusion. A diffusion pattern (not shown) may be disposed on the top surface of the light guide plate 30.

Figure 6:
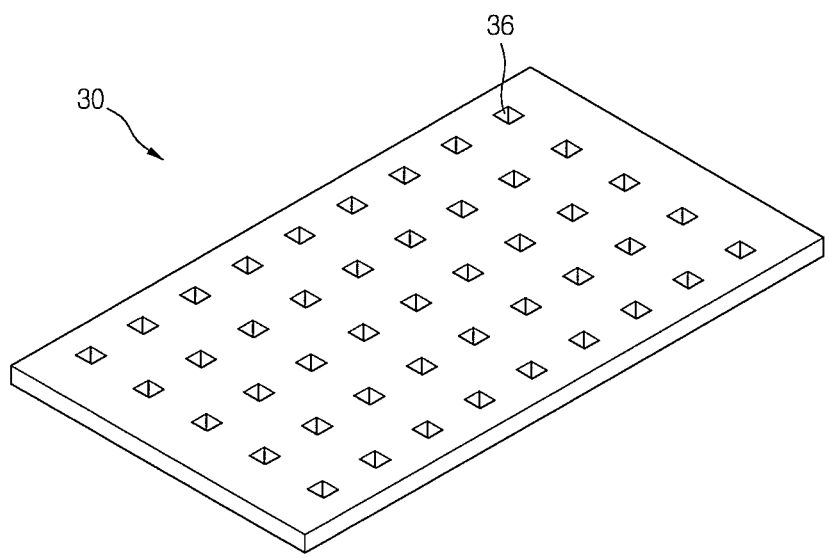
FIG. 6 is a perspective view illustrating a third usage example of the light guide plate of FIG. 1.

FIG. 6 is a perspective view illustrating a third usage example of the light guide plate of FIG. 1.

According to the third usage example of FIG. 6, the light guide plate 30 is integrated with respect to the plurality of light emitting areas as shown in FIG. 1.

That is, the light guide plate 30 does not have bodies divided for each of the light emitting areas EAs. The light guide plate 30 may be formed in one body covering the entire region of the plurality of LEDs 21 disposed within the bottom frame 10.

When the light guide plate 30 corresponding to one screen of the display panel 60 is formed in one body while being locally driven, a dark line occurring between the light guide plates 30 due to the physical separation of the light emitting areas EAs does not occur. Also, since a coupled portion is simplified, a slim backlight unit may be provided.

Here, the light guide plate 30 of FIG. 6 includes a plurality of recess parts 36 corresponding to the LEDs 21 in the bottom surface thereof.

That is, as shown in FIG. 6, the plurality of recess parts 36 arranged in a matrix form to receive the LEDs 21 are defined in the bottom surface of the light guide plate 30 with respect to the plurality of LEDs 21 arranged in a matrix form on the bottom surface of the light guide plate 30. Thus, the number of recess parts 36 may be equal to that of LEDs 21.

The integrated light guide plate 30 may be integrally manufactured with respect to the display panel 60 defining one screen through an injection molding or extrusion. A diffusion pattern (not shown) may be disposed on the top surface of the light guide plate 30.

Here, like the first usage example, the plurality of LEDs 21 arranged on the module board 20 may be a side-view type LEDs in which light is emitted through side surfaces with respect to the module board 20. That is, the LEDs 21 may be disposed within a recess part 36 of the light guide plate 30 to emit light through side surfaces of the recess part 36 of the light guide plate 30. The integrated light guide plate 30 may be used for the display device of FIGS. 1 to 3.

Hereinafter, a separate driving method of the backlight unit will be described with reference to FIG. 7.

Figure 7:
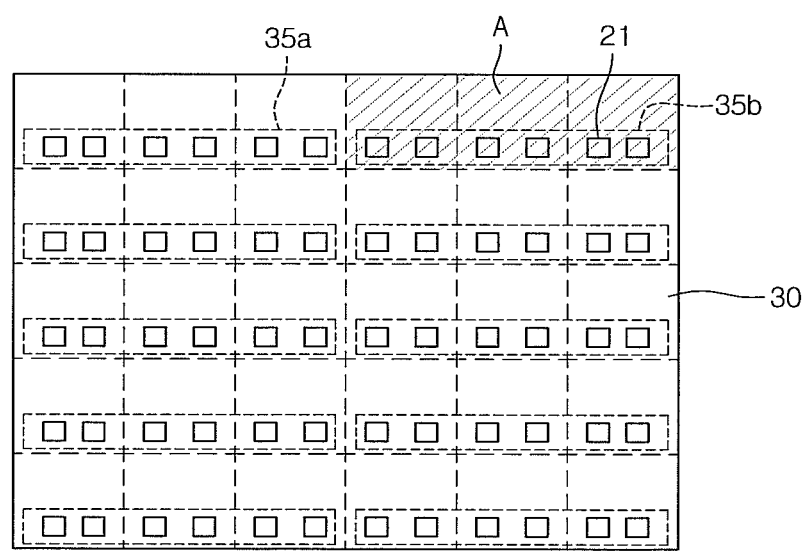
FIG. 7 is a plan view illustrating a separate driving method of a backlight unit.

FIG. 7 is a plan view illustrating a separate driving method of a backlight unit.

The backlight unit of the display device of FIGS. 1 to 6 may be driven in a separate driving method. The separate driving method may include a local dimming method or an impulsive method.

When the display device is driven in the local dimming method, the display panel 60 may be divided in a plurality display areas, and thus, the light emitting part may have a plurality of light emitting areas EAs.

Each of the light emitting areas EAs may be defined as a portion A of the light guide plate 30 on which the LEDs 21 constituting a ½ row are disposed as shown in FIG. 7.

However, the present disclosure is not limited thereto. As shown in FIG. 1, the light emitting area A of each of the LEDs 21 may define one light emitting area EA or N×M (N and M are integer values) LEDs 21 may define one light emitting area EA.

When a portion A of the light emitting plate 30 corresponding to the LEDs 21 constituting a ½ row is defined as the light emitting area EA as shown in FIG. 7, block recess parts 35a and 35b may be defined with respect to the LEDs 21 of the light emitting area EA as shown in FIG. 5. Alternatively, the tunnel-type recess part 35 may be formed with respect to one row as shown in FIG. 4, or a dot-type recess part may be formed as shown in FIG. 6.

Here, brightness of at least one LED 21 disposed on each of the light emitting areas EAs may be separately adjusted according to a grey peak value of each of light emitting areas EAs.

When the display device is driven in the impulsive method, the plurality of divided light emitting areas EAs may be synchronized with the display panel in time and successively turned on.

Hereinafter, a display device including an integrated light guide plate 30 according to a second embodiment will be described with reference to FIG. 8.

Figure 8:
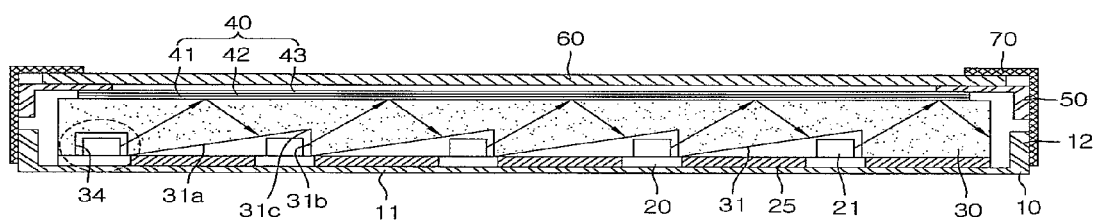
FIG. 8 is a sectional view taken along line I-I' of the display device of FIG. 1 according to a second embodiment.

FIG. 8 is a sectional view taken along line I-I' of the display device of FIG. 1 according to a second embodiment.

Like the display device of FIGS. 1 to 3, the display device of FIG. 8 includes an optical sheet 40, a fixing member 50, a display panel 60, and a top frame 70 on the light guide plate 30. Here, their descriptions will be omitted.

The display device of FIG. 8 includes a reflection sheet 25 and a light emitting module on a bottom frame 10. Also, the display device includes the integrated light guide plate 30 covering the reflection sheet 25 and the light emitting module.

The integrated light guide plate 30 has a flat top surface through which planar light is provided onto the display panel 60 and a bottom surface in which a plurality of recess parts 31 are defined.

As shown in FIGS. 4 to 6, the recess parts 31 defined in the bottom surface of the light guide plate 30 may be formed in a tunnel-type, block-type, or dot-type with respect to the plurality of LEDs 21.

The recess part 31 may be an edge-type recess part in section, which has a first surface 31a, a second surface 31b, and an intersection line at which the first surface 31a meets the second surface 31c.

The first surface 31a may be an inclined surface which is inclined at a predetermined angle with respect to a plane of the light guide plate 30. The second surface 31b may be a surface perpendicular to the plane of the light guide plate 30.

The second surface 31b may be a light incident surface facing a side surface through which light of the LED 21 is emitted. The inclined surface of the first surface 31a may guide light incident into the second surface 31b that is the light incident surface toward the top surface of the light guide plate 30.

The intersection line 31c has a length equal to that of a length direction of the recess part 31. That is, when one recess part 31 is formed in the tunnel-type as shown in FIG. 4, the intersection line 31c may have a length from one end of the light guide plate 30 to the other end. Also, when the one recess part 31 is formed in the block-type as shown in FIG. 5, the intersection line 31c may extend until the LED 21 of the corresponding block is received. Also, when the one recess part 31 is formed in the dot-type as shown in FIG. 6, the intersection line 31c may have a length equal to a width of the LED 21.

Here, the recess part 34 (a dot line of FIG. 8) disposed at an end of in a direction opposite to that in which light of the LED 21 is emitted among the recess parts 31 of the end of the light emitting plate 30 may have a square shape in section.

The LED 21 received in the recess part 31 of the light guide plate 30 is disposed adjacent to the second surface of the recess part 31 to emit light toward the second surface 31b adjacent thereto. Also, the reflection sheet 25 is disposed under the first surface 31a of the recess part 31 and is not disposed on the second surface 31b that is a light incident surface.

A diffusion pattern (not shown) may be disposed on the top surface of the light guide plate 30.

The edge-type light guide plate 30 is divided into a plurality of light emitting areas EAs. Each of the light emitting areas EAs has a size defined by the number of LEDs 21 emitting light into the corresponding light emitting areas EAs.

The light guide plate 30 does not have bodies divided for each of the light emitting areas EAs and is formed in one body. That is, although the light guide plate 30 has the plurality of divided light emitting areas EAs, the light guide plate 30 is not physically divided, but abstractly divided by an operation of the LED 21 disposed on the corresponding light emitting area EA.

As described above, when the light guide plate 30 corresponding to one screen of the display panel 60 is formed in one body while being locally driven, a dark line occurring between the light guide plates 30 due to the physical separation of the light emitting areas EAs does not occur. Also, since a coupled portion is simplified, a slim backlight unit may be provided.

Hereinafter, a display device according to a third embodiment will be described with reference to FIGS. 9 to 12.

Figure 9:
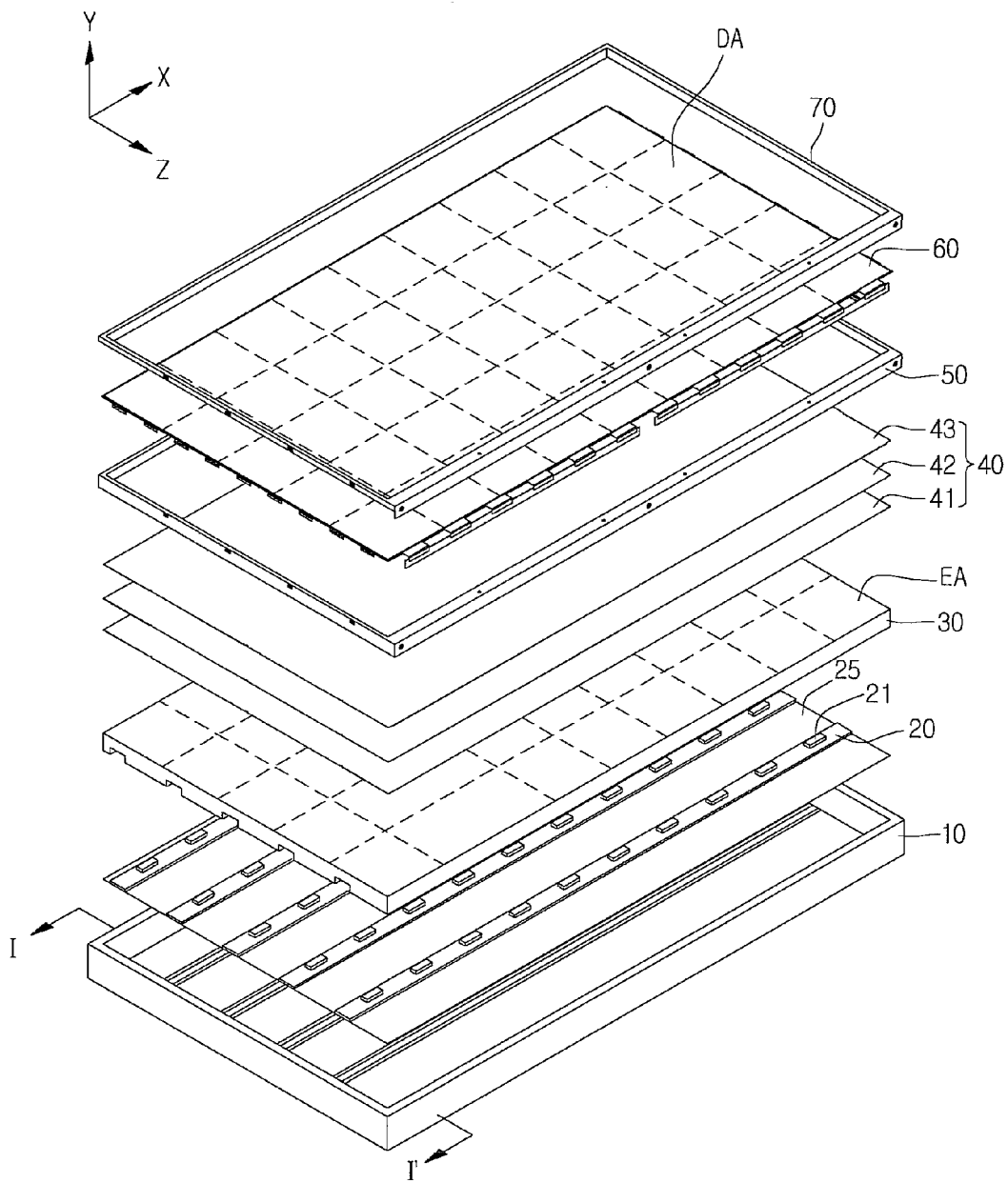
FIG. 9 is an exploded perspective view illustrating an example of a display device according to a third embodiment.
Figure 10:
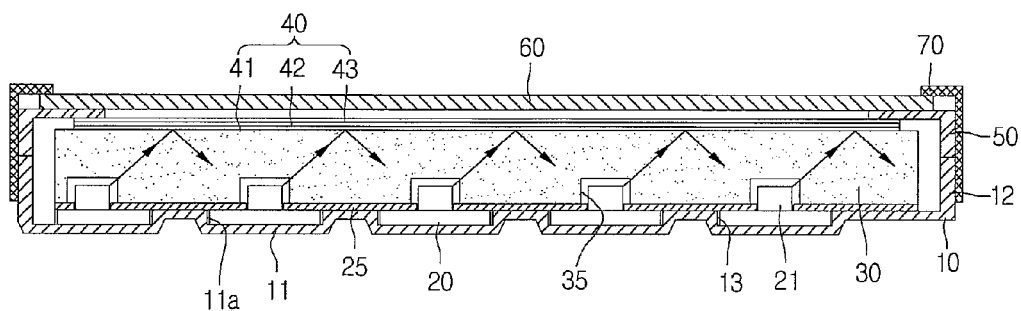
FIG. 10 is a sectional view taken along line I-I' of the display device of FIG. 9.
Figure 11:
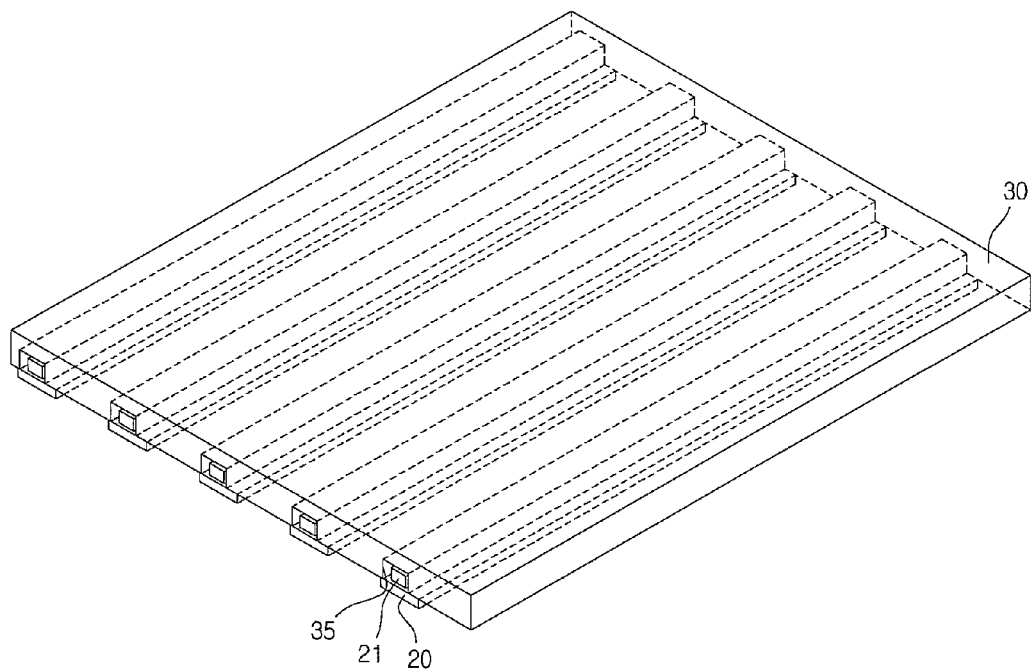
FIG. 11 is a perspective view illustrating a light emitting module of FIG. 1.
Figure 12:
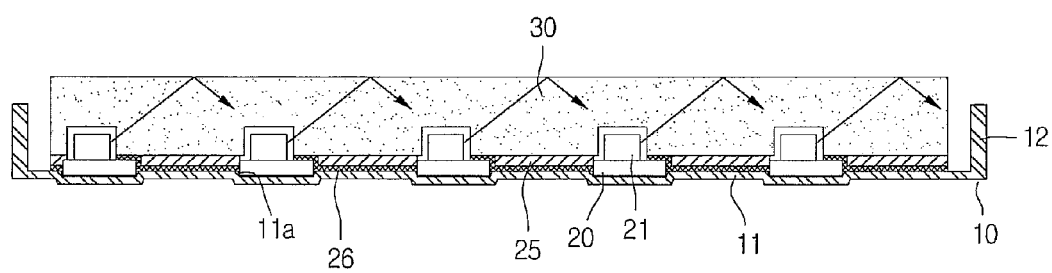
FIG. 12 is a sectional view illustrating another example of the display device according to the third embodiment.

FIG. 9 is an exploded perspective view of a display device according to a first embodiment. FIG. 10 is a sectional view taken along line I-I' of the display device of FIG. 9. FIG. 11 is a perspective view illustrating a light emitting module of FIG. 9. FIG. 12 is a sectional view illustrating another example of the display device according to the third embodiment.

Like the display device of FIGS. 1 to 3, the display device of FIG. 9 includes an optical sheet 40, a fixing member 50, a display panel 60, and a top frame 70 on the light guide plate 30. Here, their descriptions will be omitted.

The bottom frame 10 has a bottom surface 11 having a rectangular flat shape with two long sides facing each other and two short sides perpendicular to the long sides and facing each other and four sidewalls 12 vertically extending from the bottom surface 11.

The bottom frame 10 is coupled to a fixing member 50 disposed on the optical sheet 40 to receive the light emitting module, the reflection sheet 25, the light guide plate 30, and the optical sheet 40 within the bottom frame 10.

For example, the bottom frame 10 may be formed of a metal material. Also, a plurality of board grooves 11a may be defined in the bottom surface 11.

The plurality of board grooves 11a may be formed by performing a press process on the bottom frame 10. Thus, each of the board grooves 11a may be recessed more than adjacent portions.

The plurality of board grooves 11a may be parallel to each other with respect to the bottom surface 11 and extend in an X-axis direction. Each of the board grooves 11a may have a height equal to a thickness of the module board 20 of the light emitting module.

The reflection sheet 25 and the plurality of light emitting modules alternately extend in an X-axis direction on the bottom surface 11 of the bottom frame 10.

Each of the light emitting modules may be formed in a bar-type. Also, the light emitting module includes a module board 20 extending in the X-axis direction and a plurality of LEDs 21 disposed on the module board 20 in a row.

The module board 20 is buried into each of the plurality of board grooves 11a of the bottom frame 10. Since each of the board grooves 11a has a height equal to a thickness of the module board 20, the module board 20 does not protrude from the bottom surface 11.

On the other hand, even though the module board 20 is not formed in a bar-type, but formed in a block-type, the bottom frame 10 may have the board groove 11a in the bottom surface 11 with the same shape as that of the module board 20. However, the present disclosure is not limited to the shape of the board groove 11a.

The module board 20 may apply a power to each of the LEDs 21 to provide light into the light guide plate 30. Here, the LEDs 21 may be locally driven.

The plurality of LEDs 21 arranged on the module board 20 may be side-view type LEDs in which light is emitted through side surfaces with respect to the module board 20. That is, the module board 20 may be disposed within a recess part 35 of the light guide plate 30 to emit light through side surface of the recess part 35 of the light guide plate 30.

The reflection sheet 25 includes a reflecting material and a reflective metal plate to re-reflect light leaking from the light guide plate 30. A plurality of reflection sheets 25 separated from each other may be disposed in an area spaced between the module boards 20. As shown in FIG. 10, a portion of the reflection sheet 25 may overlap a portion of the module board 20 under a light guide area of the light guide plate 30.

The integrated light guide plate 30 has a top surface and a bottom surface. The top surface through which the planar light is generated is flat, and a plurality of recess parts 35 for receiving the LEDs 21 are defined in the bottom surface.

As shown in FIGS. 9 to 12, the recess part 35 has a first surface 35a that is a light incident surface facing a side surface through which light of the LED 21 is emitted, a second surface 35b parallel to the light incident surface and facing an opposite side surface of the LED 21, and a third surface 35c facing a top surface of the LED 21. Thus, the recess part 35 may be formed in a flat-type.

As shown in FIG. 10, the first surface 35a of the recess part 35 serves as a light incident surface to receive light from the side surface of the LED 21. Also, an area spaced from the light incident surface to the adjacent recess part 35 may be the light guide area and flat with respect to the top surface of the light guide plate 35 to guide the incident light, thereby transferring the light to the top surface of the light guide plate 30.

The reflection sheet 25 is not disposed in the recess part 35, but is disposed under the light guide area between the recess parts 35. As described above, when a portion of the module board 20 is disposed under the light guide area, the reflection sheet 25 may partially overlap the module board 20.

Here, a distance between the LED 21 and the first surface 35a that is the light incident surface may be shorter than that between the LED 21 and the second surface that is the side surface opposite to the first surface 35a.

Referring to FIG. 11, the recess part 35 of the light guide plate 30 may be formed in a tunnel-type which is capable of receiving the plurality of LEDs 21 constituting one row at the same time. When the LED 21 is divided in a plurality of blocks, one recess part may be defined in each of the blocks. Thus, the recess part isolated by each of LEDs 21 may be defined.

The integrated light guide plate 30 is closely attached to the bottom frame 10 with the thin reflection sheet 25 therebetween because the module board 20 of the light emitting module is buried in the board groove 11a of the bottom frame 10 and dose not protrude from the bottom frame 11.

Thus, the reflection sheet 25 may be applied regardless of a thickness of the module board 20. Thus, since a distance between the bottom frame 10 and the light guide plate 30 is short, the display device may be reduced in thickness.

As shown in FIG. 12, the contact-type display device may be provided even though the board groove 11a of the bottom frame 10 has a height less than a thickness of the module board 20.

That is, when the module board 20 is buried into the board groove 11a of the bottom frame 10, the reflection sheet 25 may be disposed between the module board 20 and the adjacent module board 20 in a case where the module board 20 has a thickness greater than a depth of the substrate groove 11a of the bottom frame 10.

Here, since the reflection sheet 25 has a thickness equal to a difference between a depth of the board groove 11a and a thickness of the module board 20, the reflection sheet may contact the module board 20 without being bent on the bottom surface of the light guide plate 30.

A portion of the module board 20 may contact the light guide area of the light guide plate 30. Thus, an adhesion sheet 26 for adhering the light guide plate 30 to the module board 20 may be disposed on the module board 20 under the light guide area of the light guide plate 30.

Here, the adhesion sheet 26 has a thin film shape. Also, the adhesion sheet 26 may be formed of a material which reflects light, like the reflection sheet 25. Thus, the adhesion sheet 26 may have adherent and reflective properties.

The adhesion sheet 26 may extend from the module board 20 to a lower portion of the reflection sheet 25 adjacent to the module board 20.

As described above, the reflection sheet 25 may be adjusted in height in a state where the module board 20 is completely buried into the board groove 11a of the bottom frame 10 to provide the same effect using the reflective adhesion sheet 26.

Since the integrated light guide plate 30 of FIG. 12 has the same structure as that of the light guide plate 30 of FIGS. 9 to 11, their descriptions will be omitted.

Hereinafter, a display device including an integrated light guide plate 30 according to a fourth embodiment will be described with reference to FIG. 13.

Figure 13:
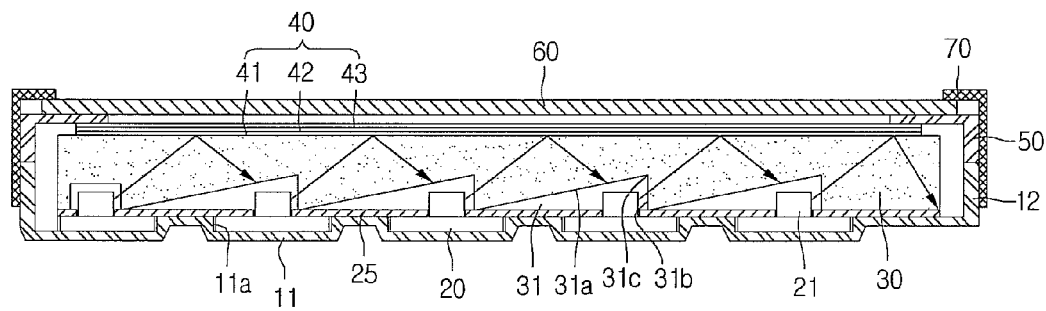
FIG. 13 is a sectional view illustrating an example of a display device according to a fourth embodiment.
Figure 14:
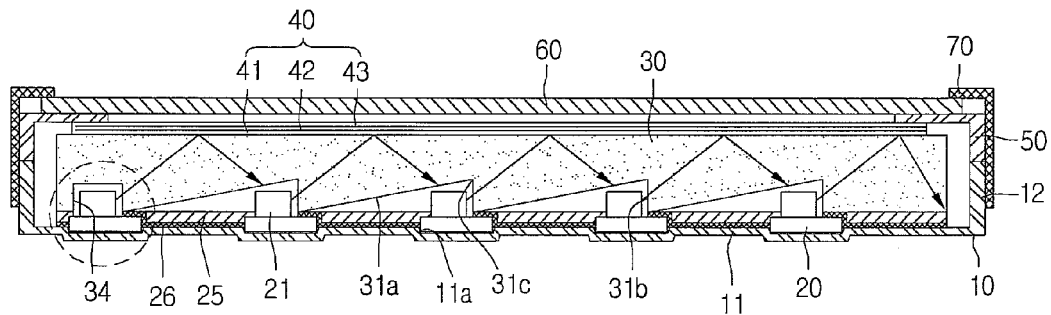
FIG. 14 is a sectional view illustrating another example of the display device according to the fourth embodiment.

FIG. 13 is a sectional view taken along line I-I' of the display device of FIG. 9 according to a fourth embodiment. FIG. 14 is a sectional view illustrating another example of the display device according to the fourth embodiment.

Like the display device of FIGS. 1 to 3, the display device of FIG. 13 includes an optical sheet 40, a fixing member 50, a display panel 60, and a top frame 70 on the light guide plate 30. Here, their descriptions will be omitted.

A bottom frame 10 of FIG. 13 may be formed of a metal material. A plurality of board grooves 11a in which a module board 20 is buried are defined in a bottom surface 11 of the bottom frame 10.

The plurality of board grooves 11a may be formed by performing a press process on the bottom frame 10. Thus, each of the board grooves 11a may be recessed more than adjacent portions.

The plurality of board grooves 11a may be disposed parallel to the bottom surface 11 and in a predetermined direction. Also, each of the board grooves 11a may have a height equal to a thickness of the module board 20 of a light emitting module.

A reflection sheet 25 and the plurality of light emitting modules may be alternately disposed on the bottom surface 11 of the bottom frame 10.

Each of the light emitting modules includes a module board 20 and a plurality of LEDs 21 disposed on the module board 20.

The module board 20 is buried into each of the plurality of board grooves 11a of the bottom frame 10. Since each of the board grooves 11a has a height equal to a thickness of the module board 20, the module board 20 does not protrude from the bottom surface 11.

On the other hand, when the module board 20 is formed in a bar-type as shown in FIG. 1, the board groove 11a may be formed in the bar-type. Also, when the module board 20 is formed in a block-type, the bottom frame 10 may have the board groove 11a in the bottom surface 11 with the same shape as that of the module board 20. However, the present disclosure is not limited to the shape of the board groove 11a.

The integrated light guide plate 30 has a flat top surface through which planar light is provided onto the display panel 60 and a bottom surface in which a plurality of recess parts 31 are defined.

The recess part 31 may be an edge-type recess part in section, which has a first surface 31a, a second surface 31b, and an intersection line at which the first surface 31a meets the second surface 31c.

As shown in FIG. 14, when the board groove 11a of the bottom frame 10 has a height less than a thickness of the module board 20, the reflection sheet 25 may have a thickness corresponding to a difference between a height of the board groove 11a and a thickness of the module board 20.

That is, when the module board 20 is buried into the board groove 11a of the bottom frame 10, the reflection sheet 25 may be disposed between the module board 20 and the adjacent module board 20 in a case where the module board 20 has a thickness greater than a depth of the substrate groove 11a of the bottom frame 10.

Here, since the reflection sheet 25 has a thickness equal to a difference between a depth of the board groove 11a and a thickness of the module board 20, the reflection sheet may contact the module board 20 without being bent on the bottom surface of the light guide plate 30.

Here, a portion of the module board 20 may be disposed under a light guide area of the light guide plate 30. Thus, an adhesion sheet 26 for adhering the light guide plate 30 to the module board 20 may be disposed on the module board 20 under the light guide area of the light guide plate 30.

Here, the adhesion sheet 26 has a thin film shape. Also, the adhesion sheet 26 may be formed of a material which reflects light, like the reflection sheet 25. Thus, the adhesion sheet 26 may have adherent and reflective properties.

The adhesion sheet 26 may extend from the module board 20 to a lower portion of the reflection sheet 25 adjacent to the module board 20.

As shown in FIG. 14, even though the edge-type integrated light guide plate 30 is used and a portion of the module board 20 is buried into the lower frame 10, a slim display device may be manufactured using the reflective adhesion sheet 26.

Hereinafter, a display device according to a fifth embodiment will be described with reference to FIGS. 15 to 18.

Figure 15:
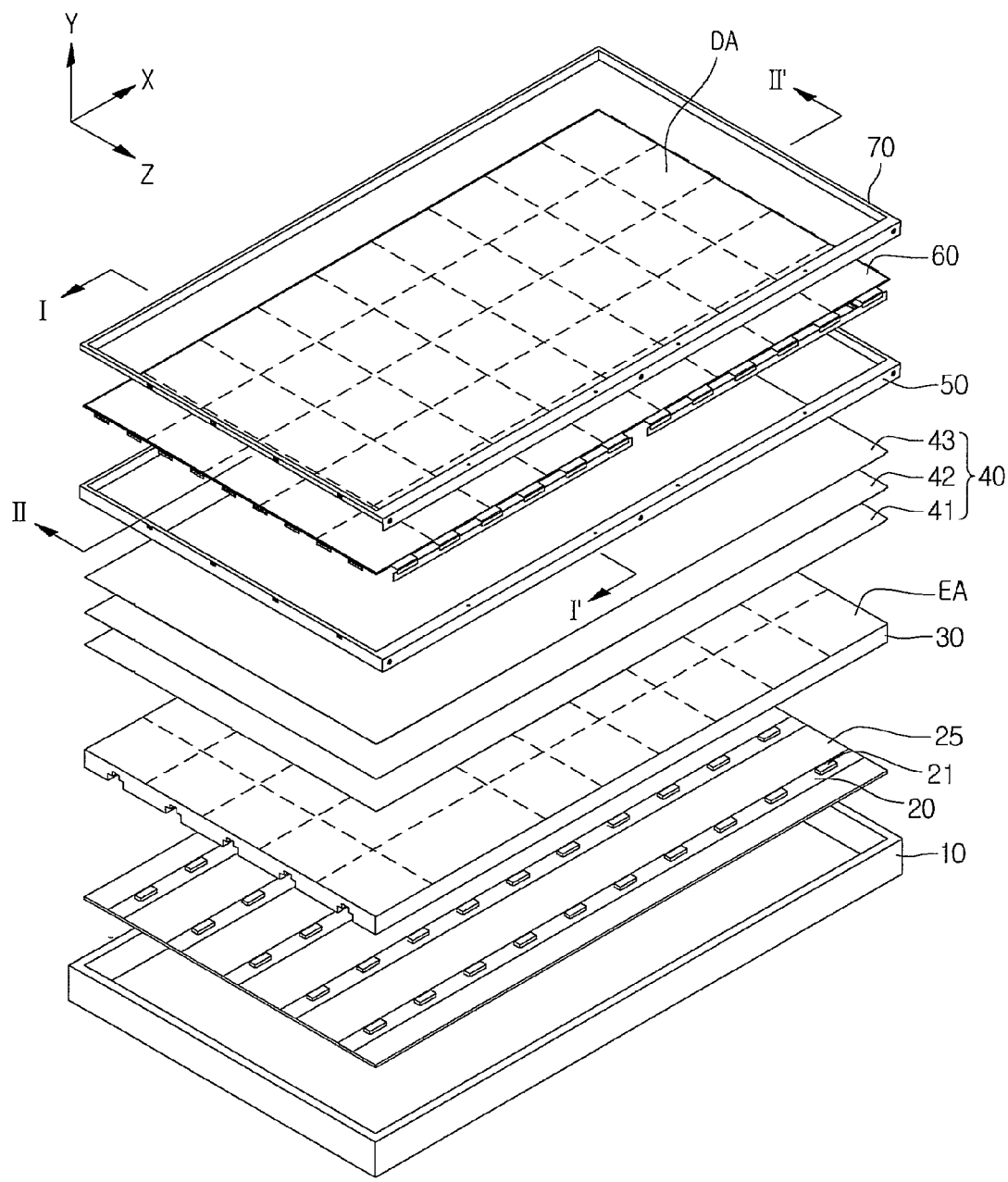
FIG. 15 is an exploded perspective view illustrating an example of a display device according to a fifth embodiment.
Figure 16:
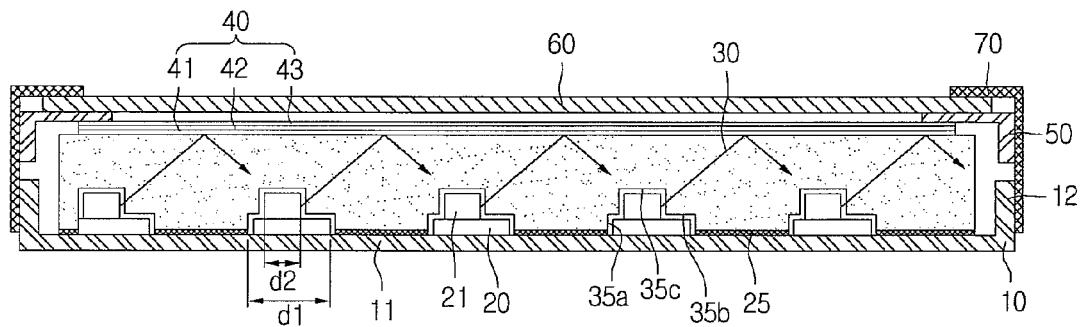
FIG. 16 is a sectional view taken along line I-I' of the display device of FIG. 15.
Figure 17:
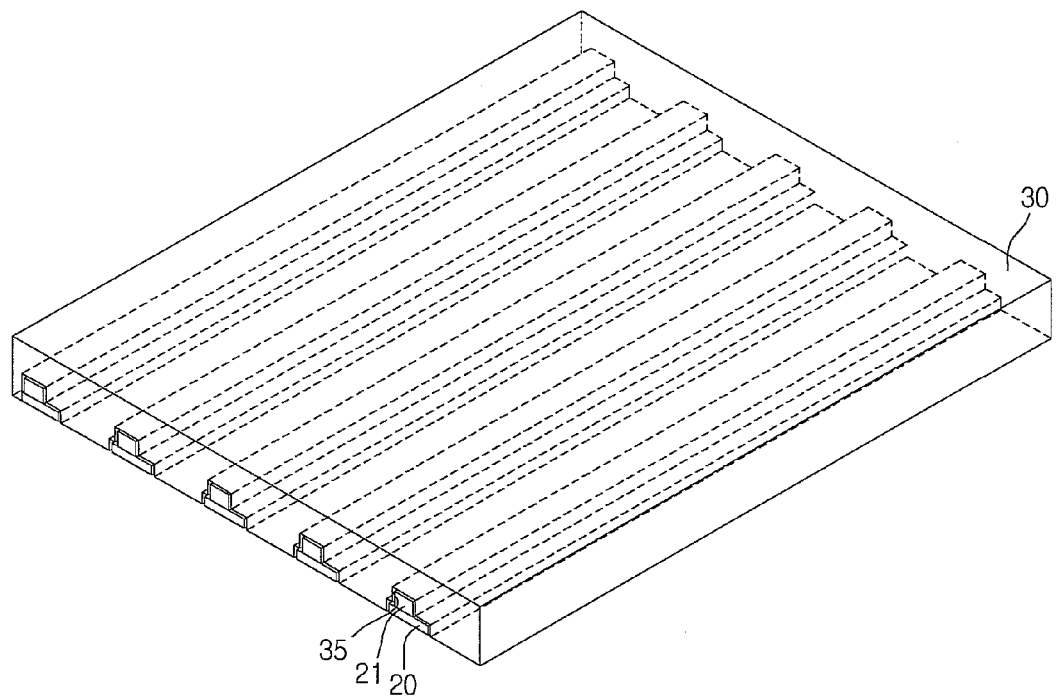
FIG. 17 is a perspective view illustrating a light emitting module of FIG. 15.
Figure 18:
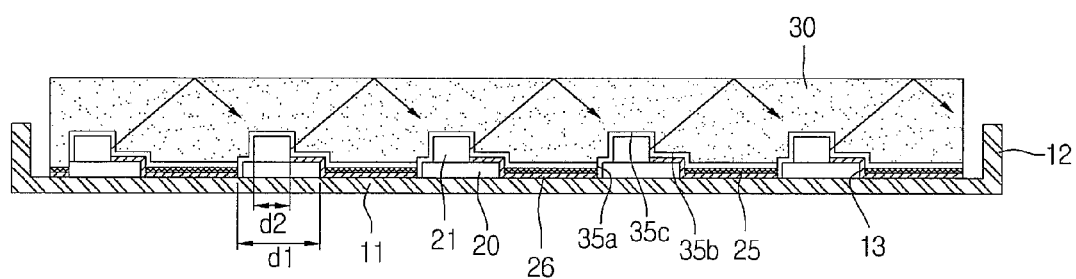
FIG. 18 is a sectional view illustrating another example of the display device according to the fifth embodiment.

FIG. 15 is an exploded perspective view of a display device according to a fifth embodiment. FIG. 16 is a sectional view taken along line I-I' of the display device of FIG. 15. FIG. 17 is a perspective view illustrating a light emitting module of FIG. 15. FIG. 18 is a sectional view illustrating another example of the display device according to the fifth embodiment.

Like the display device of FIGS. 1 to 3, the display device of FIG. 15 includes an optical sheet 40, a fixing member 50, a display panel 60, and a top frame 70 on the light guide plate 30. Here, their descriptions will be omitted.

The plurality of LEDs 21 arranged on the module board 20 may be side-view type LEDs in which light is emitted through side surfaces with respect to the module board 20. That is, the module board 20 may be disposed within a recess part 35 of the light guide plate 30 to emit light through side surface of the recess part 35 of the light guide plate 30.

The display device includes the light guide plate 30 diffusing and reflecting the light emitted from the LEDs 21 to produce planar light, thereby emitting the planar light onto the display panel 60 above the plurality of light emitting modules and the plurality of reflection sheets 25.

The integrated light guide plate 30 has a top surface and a bottom surface. The top surface through which the planar light is generated is flat, and a plurality of recess parts 35 for receiving the LEDs 21 are defined in the bottom surface.

As shown in FIGS. 15 to 18, the recess part 35 has a first surface 35a that is a light incident surface facing a side surface through which light of the LED 21 is emitted, a second surface 35b parallel to the light incident surface and facing an opposite side surface of the LED 21, and a third surface 35c facing a top surface of the LED 21. Thus, the recess part 35 may be formed in a flat-type.

As shown in FIG. 16, the first surface 35a of the recess part 35 serves as a light incident surface to receive light from the side surface of the LED 21. Also, an area spaced from the light incident surface to the adjacent recess part 35 may be the light guide area and flat with respect to the top surface of the light guide plate 35 to guide the incident light, thereby transferring the light to the top surface of the light guide plate 30.

Here, a section of the recess part 35 defined by the first surface 35a, the second surface 35b, and the third surface 35c may have a steped structure for receiving the LED 21 and the module board 20 supporting the LED 21 at the same time.

That is, the recess part 35 includes a first layer opened toward a bottom surface of the light emitting plate 30 to have a first width d1 for receiving the module board 20 and a second layer disposed on the first layer and having a second width d2 for receiving the LED 21.

The second width d2 of the second layer may be equal to that of the third surface 35c, and the first width d1 may be greater than the second width d2.

Although the side surfaces 35a and 35b of the recess part 35 have a discontinuous steped structure in FIGS. 15 to 18, the present disclosure is not limited thereto. For example, the side surface extending from the second width d2 to the first width d1 may be continuously opened toward the bottom surface.

Here, the reflection sheet 25 is not disposed in the recess part 35, but is disposed under the light guide area between the recess parts 35.

Here, a distance between the LED 21 and the first surface 35a that is the light incident surface may be shorter than that between the LED 21 and the second surface that is the side surface opposite to the first surface 35a.

Referring to FIG. 17, the recess part 35 of the light guide plate 30 may be formed in a tunnel-type which is capable of receiving the plurality of LEDs 21 constituting one row at the same time. When the LED 21 is divided in a plurality of blocks, one recess part may be defined in each of the blocks. Thus, the recess part isolated by each of LEDs 21 may be defined.

The integrated light guide plate 30 is closely attached to the bottom frame 10 with the thin reflection sheet 25 therebetween because the module board 20 of the light emitting module is buried in the board groove 11a of the bottom frame 10 and dose not protrude from the bottom frame 11.

Thus, a distance between the bottom frame 10 and the light guide plate 30 may become short to reduce a thickness of the display device. Also, the light guide plate 30 and the light emitting module may be aligned to prevent the light emitting module from getting out of the light guide plate 30 when the light guide plate 30 is thermally expanded.

When the module board 20 is buried into the recess part 35 of the light guide plate 30, a portion of the module board 20 may be disposed under the light guide area of the light guide plate 30.

As shown in FIG. 18, the display device may include an adhesion sheet 26 on the module board 20 under the light guide area of the light guide plate 30.

Here, the adhesion sheet 26 has a thin film shape. Also, the adhesion sheet 26 may be formed of a material which reflects light, like the reflection sheet 25. Thus, the adhesion sheet 26 may have adherent and reflective properties. The adhesion sheet 26 may extend from the module board 20 to a lower portion of the reflection sheet 25 adjacent to the module board 20.

Since the integrated light guide plate 30 of FIG. 18 has the same structure as that of the light guide plate 30 of FIGS. 15 to 17, their descriptions will be omitted.

Hereinafter, a display device including an integrated light guide plate 30 according to a sixth embodiment will be described with reference to FIG. 19.

Figure 19:
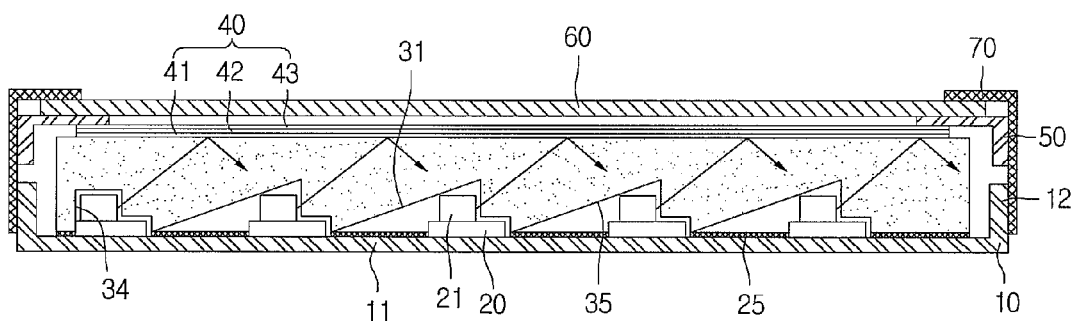
FIG. 19 is a sectional view of a display device according to a sixth embodiment.

FIG. 19 is a sectional view taken along line I-I' of the display device of FIG. 15 according to a sixth embodiment.

Like the display device of FIGS. 1 to 3, the display device of FIG. 19 includes an optical sheet 40, a fixing member 50, a display panel 60, and a top frame 70 on the light guide plate 30. Here, their descriptions will be omitted.

The integrated light guide plate 30 has a flat top surface through which planar light is provided onto the display panel 60 and a bottom surface in which a plurality of recess parts 31 are defined.

The LED 20 and the module board 20 may be buried into the recess part 31. The recess part 31 may be an edge-type recess part in section, which has a first surface 31a, a second surface 31b, and an intersection line at which the first surface 31a meets the second surface 31c.

The first surface 31a may be an inclined surface which is inclined at a predetermined angle with respect to a plane of the light guide plate 30. The second surface 31b may be a surface perpendicular to the plane of the light guide plate 30.

The second surface 31b may be a light incident surface facing a side surface through which light of the LED 21 is emitted. The inclined surface of the first surface 31a may guide light incident into the second surface 31b that is the light incident surface toward the top surface of the light guide plate 30.

Here, the second surface 31b has a stepped structure for receiving the module board 20. That is, an area between the intersection line 31c and an intersection line of the second surface 31b and the bottom surface on the second surface 31b is not disposed on a straight line and is inclined to increase a width of an inlet of the recess part 31.

Thus, as shown in FIG. 19, the second surface 31b may have a discontinuous stepped structure. Also, an area between the intersection line 31c and an intersection line of the second surface 31b and the bottom surface may be a continuous surface.

The intersection line 31c has a length equal to that of a length direction of the recess part 31.

Here, the recess part 31 (a circular dot line of FIG. 19) disposed at an end of in a direction opposite to that in which light of the LED 21 is emitted among the recess parts 31 of the end of the light emitting plate 30 may have a stepped structure in section as shown in FIG. 2.

The LED 21 received in the recess part 31 of the light guide plate 30 is disposed adjacent to the second surface of the recess part 31 to emit light toward the adjacent second surface 31b.

As described above, when the light guide plate 30 corresponding to one screen of the display panel 60 is formed in one body while being locally driven, a dark line occurring between the light guide plates 30 due to the physical separation of the light emitting areas EAs does not occur. Also, since a coupled portion is simplified, a slim backlight unit may be provided.

As shown in FIG. 18, when the light guide area and the module board 20 partially overlap each other, a reflective adhesion sheet (not shown) may be further disposed on a portion at which the module board 20 of FIG. 6 and the light guide area overlap each other.

Here, the adhesion sheet may have a thin film shape. Also, the adhesion sheet may be formed of a material which reflects light, like the reflection sheet 25. Thus, the adhesion sheet may have adherent and reflective properties.

That is, as shown in FIG. 19, the edge-type integrated light guide plate 30 may be used, and also the reflective adhesion sheet may be disposed on the module board 20 to secure the reflective property. Thus, a slim display device may be manufactured.

Hereinafter, a display device according to a seventh embodiment will be described with reference to FIGS. 20 to 24.

Figure 20:
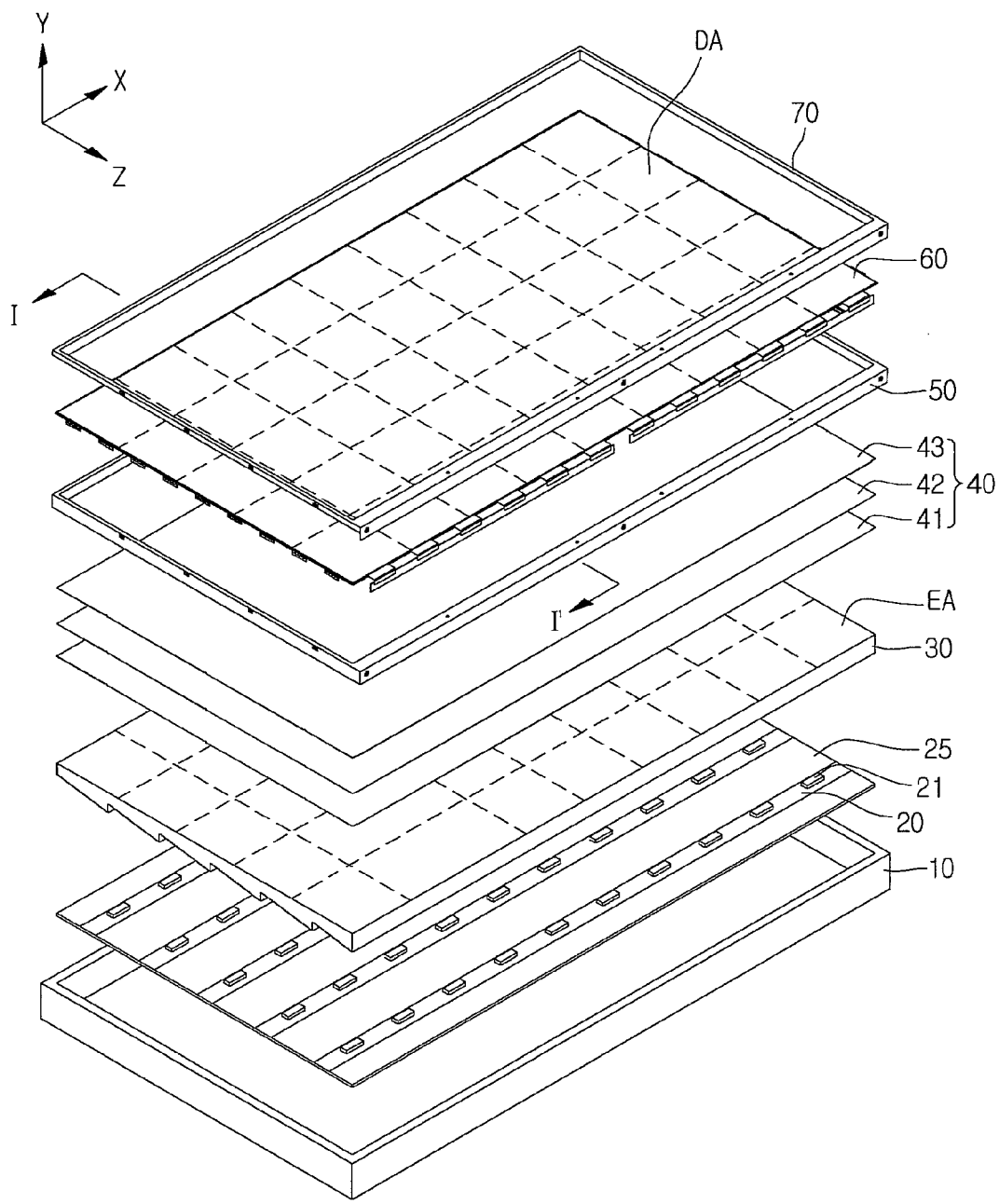
FIG. 20 is an exploded perspective view of a display device according to a seventh embodiment.
Figure 21:
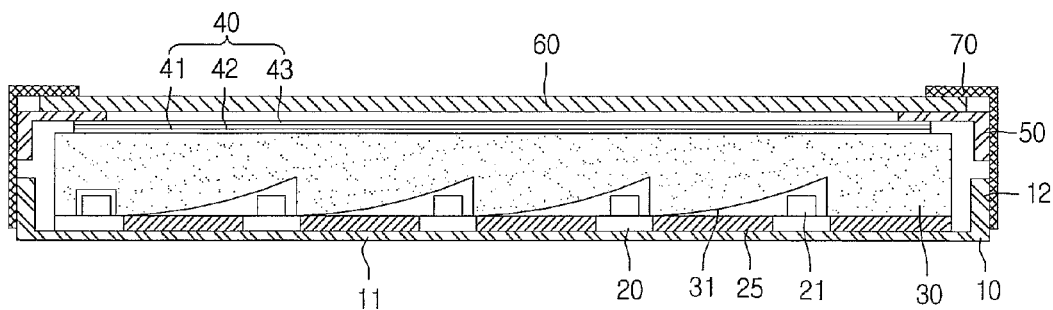
FIG. 21 is a sectional view taken along line I-I' of the display device of FIG. 20 and illustrates a first application example of a recess part.
Figure 22:
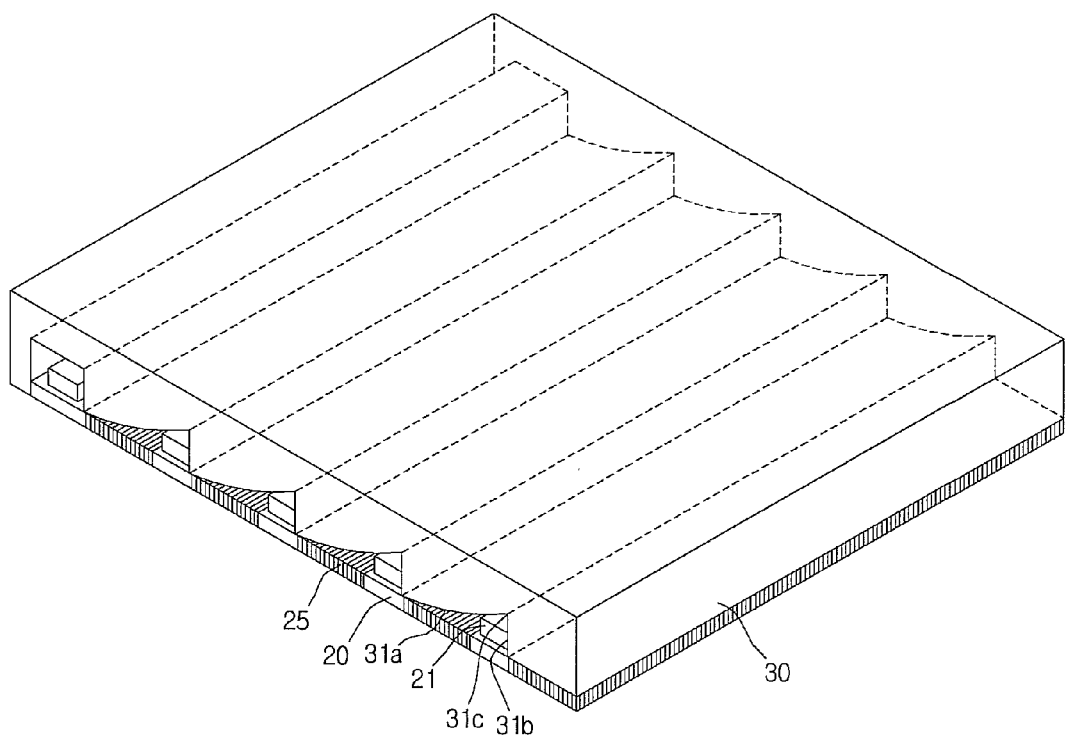
FIG. 22 is a perspective view illustrating a light source of FIG. 20.
Figure 23:
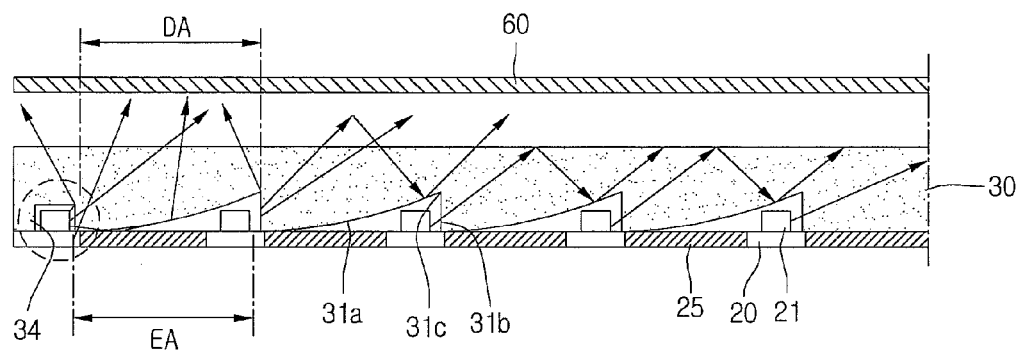
FIG. 23 is a schematic view illustrating the display device of FIG. 21.
Figure 24:
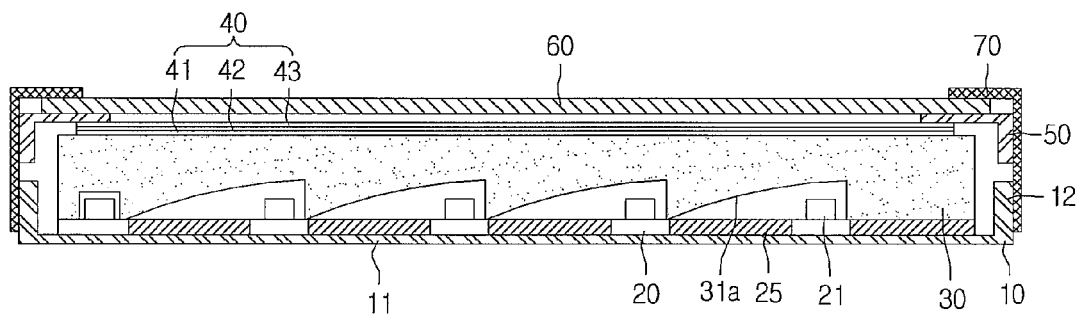
FIG. 24 is a sectional view illustrating a second application example of the recess part according to the seventh embodiment.

FIG. 20 is an exploded perspective view of a display device according to a seventh embodiment. FIG. 21 is a sectional view taken along line I-I' of the display device of FIG. 20 and illustrates a first application example of a recess part. FIG. 22 is a perspective view illustrating a light source of FIG. 20. FIG. 23 is a simplified view illustrating the display device of FIG. 21. FIG. 24 is a sectional view illustrating a second application example of the recess part according to the seventh embodiment.

The display device includes the light guide plate 30 diffusing and reflecting the light emitted from the LEDs 21 to produce planar light, thereby emitting the planar light onto the display panel 60 above the plurality of light emitting modules and the plurality of reflection sheets 25.

The integrated light guide plate 30 has a top surface and a bottom surface. The top surface through which the planar light is generated is flat, and a plurality of recess parts 31 for receiving the LEDs 21 are defined in the bottom surface.

The recess part 31 may be an edge-type recess part which has a first surface 31a, a second surface 31b, and an intersection line at which the first surface 31a meets the second surface 31c.

The first surface 31a may be an inclined surface which is inclined at a predetermined angle with respect to a flat top surface of the light guide plate 30. The second surface 31b may be a surface perpendicular to the top surface of the light guide plate 30.

The second surface 31b may be a light incident surface facing a side surface through which light of the LED 21 is emitted. The inclined surface of the first surface 31a may guide light incident into the second surface 31b that is the light incident surface toward the top surface of the light guide plate 30.

The first surface 31a has a variation so that the first surface 31a has a distance greater than that of a straight line from an intersection line of the first surface 31a and the second surface 31b to the intersection line 31c.

The first surface 31a may recessed toward the bottom frame 10 to diffuse-reflect light, thereby reducing hot spot.

The first surface 31a may be recessed toward the bottom frame 10 as shown in FIG. 24. Thus, the inclined first surface 31a may have a recessed variation to increase the diffuse reflection of light.

The intersection line 31c has a length equal to that of a length direction of the recess part 31. That is, when one recess part 31 receives the plurality of LEDs 21 constituting one row, the intersection line 31c may have a length from one end of the light guide plate 30 to the other end.

Here, the recess part 31 (a dot line of FIG. 23) disposed at an end of in a direction opposite to that in which light of the LED 21 is emitted in the recess parts 31 of the end of the light emitting plate 30 may have a square shape in section.

As shown in FIGS. 22 to 24, the LED 21 received in the recess part 31 of the light guide plate 30 is disposed adjacent to the second surface of the recess part 31 to emit light toward the adjacent second surface 31b. Also, the reflection sheet 25 is disposed under the first surface 31a of the recess part 31 and is not disposed on the second surface 31b that is a light incident surface.

As described above, the plurality of recess parts 31 may be defined in the bottom surface of the light guide plate 30. At least one LED 21 may be disposed in each of the recess parts to locally drive the LEDs while providing improved light uniformity.

The light guide plate 30 does not have bodies separated for each of the light emitting areas EAs. That is, the light guide plate 30 may be formed in one body covering the entire region of the plurality of LEDs 21 disposed within the bottom frame 10.

That is, although the light guide plate 30 has the plurality of divided light emitting areas EAs, the light guide plate 30 is not physically divided, but abstractly divided by an operation of the LED 21 disposed on the corresponding light emitting area EA.

Hereinafter, a display device according to an eight embodiment will be described with reference to FIGS. 25 to 28.

Figure 25:
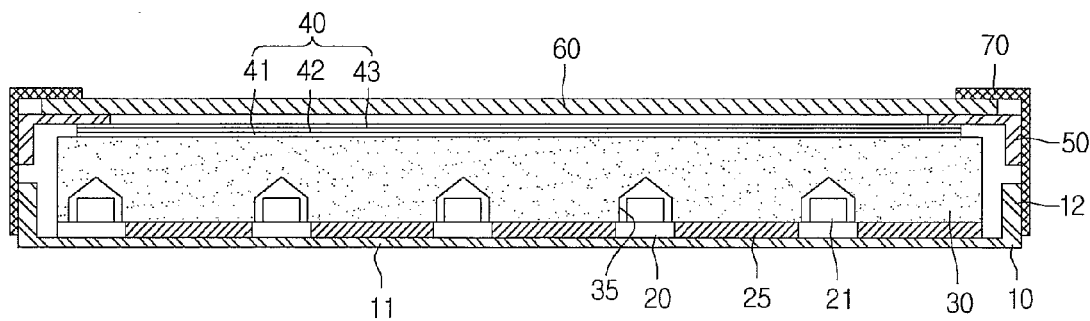
FIG. 25 is a sectional view of a display device according to an eighth embodiment.
Figure 26:
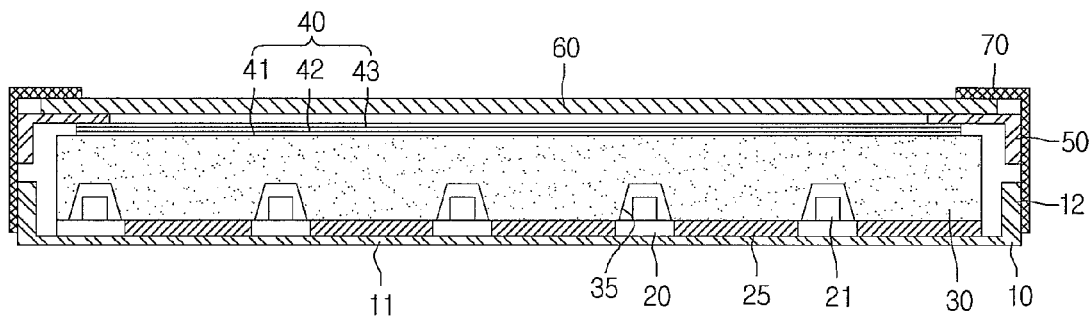
FIGS. 26 to 28 are sectional views illustrating various application examples of a recess part according to the eighth embodiment.
Figure 27:
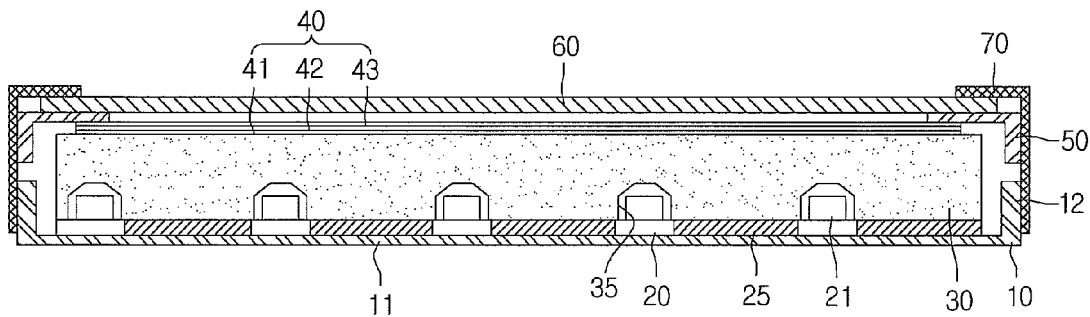
Figure 28:
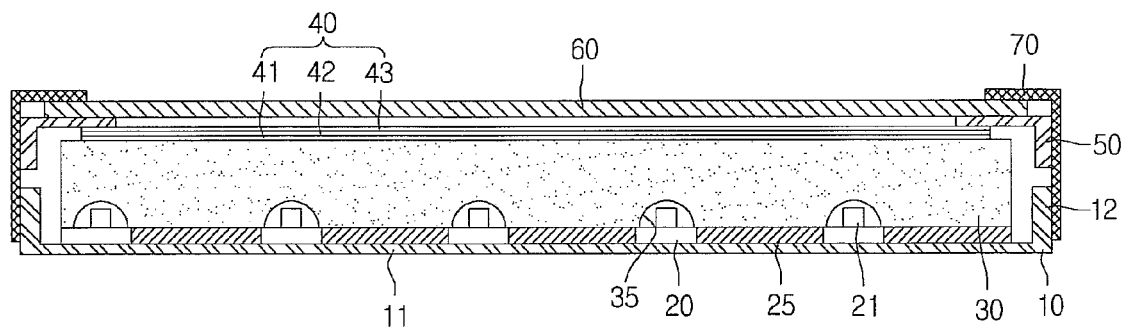

FIG. 25 is a sectional view of a display device according to an eighth embodiment. FIGS. 26 to 28 are sectional views illustrating various application examples of a recess part according to the eighth embodiment.

Referring to FIG. 25, like the display device of FIGS. 1 to 5, a display device according to an eighth embodiment includes an optical sheet 40, a fixing member 50, a display panel 60, and a top frame 70 on the light guide plate 30. Here, their descriptions will be omitted.

The display device of FIG. 25 includes a reflection sheet 25 and a light emitting module on a bottom frame 10. Also, the display device includes the integrated light guide plate 30 covering the reflection sheet 25 and the light emitting module.

Here, the integrated light guide plate 30 has a flat top surface through which planar light is provided onto the display panel 60 and a bottom surface in which a plurality of recess parts 35 are defined.

The display device of FIGS. 25 to 28 includes a flat-type light guide plate 30 in which a light guide area between the recess parts has a plate shape parallel to the top surface.

Here, the recess part 35 of the integrated light guide plate 30 may have various shapes as well as a rectangular shape. For example, as shown in FIG. 25, the recess part 35 may have a pentagonal shape. As shown in FIG. 26, the recess part 35 may have a trapezoid shape. As shown in FIG. 27, the recess part 35 may have a hexagonal shape. As shown in FIG. 28, the recess part 35 may have an arc shape.

However, the recess part 35 of the light guide plate 30 is not limited to its shape. For example, the recess part 35 may have a polygonal shape having a plurality of angles. As described above, when the recess part 35 has various shapes and a light incident surface has a variation with respect to the LED 21, light may be diffuse-reflected to reduce hot spot.

The LED 21 may be received in the recess part 35 of the light guide plate 30. The LED 21 may emit light toward one side surface of the recess part 35.

Here, a distance between the LED 21 and the side surface through which the light is emitted is near than that between the LED 21 and a side surface opposite to the side surface.

As described above, when the flat-type light guide plate is provided, the display device may be easily manufactured due to its simplified structure. Also, the LED 21 may be fixed to each of the recess parts 35 to easily fix the LED 21.

Also, since the light guide area of the light guide plate 30 is flat, an optical pattern such as a scattering pattern or a prism pattern may be easily formed.

The flat-type light guide plate 30 is divided into a plurality of light emitting areas EAs. Each of the light emitting areas EAs has a size defined by the number of LEDs 21 emitting light into the corresponding light emitting areas EAs.

The light guide plate 30 does not have bodies divided for each of the light emitting areas EAs and is formed in one body.

That is, although the light guide plate 30 has the plurality of divided light emitting areas EAs, the light guide plate 30 is not physically divided, but abstractly divided by an operation of the LED 21 disposed on the corresponding light emitting area EA.

As described above, when the light guide plate 30 corresponding to one screen of the display panel 60 is formed in one body while being locally driven, a dark line occurring between the light guide plates 30 due to the physical separation of the light emitting areas EAs does not occur. Also, since a coupled portion is simplified, a slim backlight unit may be provided.

Also, when the integrated light guide plate 30 having the flat-type recess part 35 is provided, manufacturing processes may be simplified. Also, the separate driving method such as a local dimming method or an impulsive method may be provided to reduce power consumption as well as improve contrast of a screen, thereby improving an image quality of the display device.

Hereinafter, a display device according to a ninth embodiment will be described with reference to FIG. 29.

Figure 29:
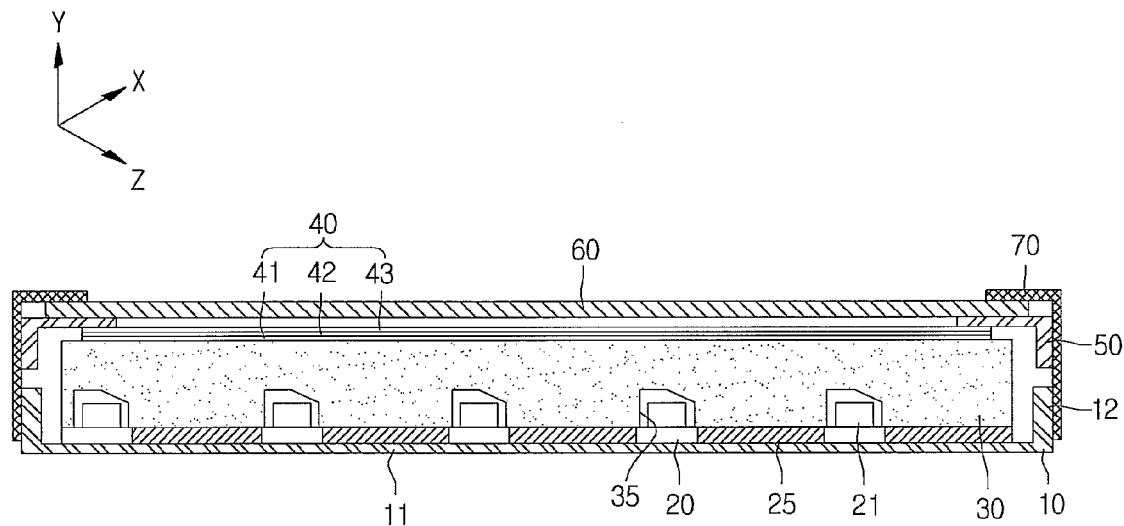
FIG. 29 is a sectional view of a display device according to a ninth embodiment.

Referring to FIGS. 25 and 28, when a flat-type recess part 35 is provided, the recess part 35 may have an asymmetric shape as shown in FIG. 29 because an LED 21 emits light toward a side surface of the recess part 35.

That is, the recess part 35 of the integrated light guide plate 30 is not symmetric with respect to a Y-axis in section. A right part having a light incident surface through which light is incident may have a plurality of angles or be inclined so that it has a variation as shown in FIGS. 25 to 28. Also, a left part may have a rectangular shape along a profile of the LED 21.

As described above, the variation may be formed only on the recess part 35 to which light is incident to improve the hot spot and easily manufacture the integrated light guide plate 30.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit configured to emit light onto a display panel in which one screen is defined into a plurality of display areas, the backlight unit comprising:
   a bottom frame having an inside surface and a sidewall;
   an integrated light guide plate disposed on the inside surface of the bottom frame and including a plurality of recess parts, the plurality of recess parts having an inclined top surface and a vertical side surface;
   a plurality of reflection sheets disposed on the inside surface of the bottom frame, the plurality of reflection sheets being disposed under the inclined top surface;
   a plurality of light emitting modules including module boards and LEDs, and disposed on the inside surface of the bottom frame, the plurality of light emitting modules being disposed under the inclined top surface,
   wherein each of the plurality of recess parts extends in a first direction on the inside surface of the bottom frame,
   wherein each of the plurality of reflection sheets extends in the first direction on the inside surface within the bottom frame,
   wherein each of the plurality of light emitting modules extends in the first direction on the inside surface within the bottom frame,
   wherein the plurality of reflection sheets and the plurality of light emitting modules alternately extend in the first direction on the inside surface within the bottom frame, and
   wherein the plurality of reflection sheets are disposed between the module boards.

2. The backlight unit according to claim 1, wherein the LEDs are received in the recess parts so that light generated from the LEDs is incident into the vertical side surface of the recess parts.

3. The backlight unit according to claim 2, wherein the recess parts of the integrated light guide plate is formed in a block-type to receive the plurality of LEDs defining the light emitting areas at the same time.

4. The backlight unit according to claim 2, wherein the recess parts of the integrated light guide plate is formed in a dot-type to isolatedly receive each of the LEDs.

5. The backlight unit according to claim 1, further comprising a plurality of board grooves formed in the inside surface of the bottom frame,
   wherein each of the module boards are disposed on a corresponding one of the plurality of board grooves.

6. The backlight unit according to claim 5, wherein the board grooves have a height equal to a thickness of the module boards.

7. The backlight unit according to claim 6, wherein a portion of the reflection sheets is disposed on the module boards.

8. The backlight unit according to claim 5, wherein the board grooves have a height less than a thickness of the module boards.

9. The backlight unit according to claim 1, wherein the plurality of recess parts are formed at a bottom surface of the integrated light guide plate.

10. The backlight unit according to claim 1, wherein each of the plurality of recess parts has a stepped structure in a vertical direction for receiving each of the module boards.

11. A backlight unit comprising:
    a bottom frame having an inside portion and a sidewall;
    an integrated light guide plate disposed on the inside portion of the bottom frame and including a plurality of recess parts, the plurality of recess parts having a inclined top surface and a vertical side surface;
    a plurality of reflection sheets disposed on the inside portion of the bottom frame, the plurality of reflection sheets being disposed under the inclined top surface; and
    a plurality of light emitting modules including module boards and LEDs, and disposed on the inside portion of the bottom frame, the plurality of light emitting modules being disposed under the inclined top surface,
    wherein a plurality of board grooves are formed in the inside portion of the bottom frame, and
    wherein each of the module boards are disposed on a corresponding one of the plurality of board grooves.

12. The backlight unit according to claim 11, wherein the LEDs are received in the recess parts so that light generated from the LEDs is incident into the vertical side surface of the recess parts.

13. The backlight unit according to claim 11, wherein the board grooves have a height equal to a thickness of the module boards.

14. The backlight unit according to claim 11, wherein a portion of the reflection sheets is disposed on the module boards.

15. The backlight unit according to claim 11, wherein the board grooves have a height less than a thickness of the module boards.

* * * * *